(12) United States Patent
Vinson et al.

(10) Patent No.: US 11,460,137 B2
(45) Date of Patent: Oct. 4, 2022

(54) FLUID CONNECTION SYSTEMS

(71) Applicant: Parker-Hannifin Corporation, Cleveland, OH (US)

(72) Inventors: Scott A. Vinson, Fairfield, OH (US); Le Yu, Dublin, OH (US); Jason D. Patch, Columbus, OH (US); John M. Holzheimer, Mentor, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 54 days.

(21) Appl. No.: 17/123,419

(22) Filed: Dec. 16, 2020

(65) Prior Publication Data

US 2021/0285586 A1    Sep. 16, 2021

Related U.S. Application Data

(60) Provisional application No. 62/988,663, filed on Mar. 12, 2020.

(51) Int. Cl.
*F16L 37/252*    (2006.01)

(52) U.S. Cl.
CPC .................................. *F16L 37/252* (2013.01)

(58) Field of Classification Search
CPC ..... F16L 37/244; F16L 37/252; F16L 37/248; F16L 37/113; F16L 37/004
USPC ..................................................... 285/82, 91
See application file for complete search history.

(56) References Cited

U.S. PATENT DOCUMENTS

| | | | | |
|---|---|---|---|---|
| 322,286 | A | * | 7/1885 | Hemje ................... F16L 37/252 285/361 |
| 554,666 | A | * | 2/1896 | Feltner .................. F16L 37/252 285/259 |
| 789,541 | A | * | 5/1905 | Hayes .................... F16L 37/252 285/376 |

(Continued)

FOREIGN PATENT DOCUMENTS

| CA | 2 859 196 C | 7/2013 |
|---|---|---|
| EP | 2 800 920 B1 | 2/2019 |
| WO | WO 2010/024828 A1 | 3/2010 |

OTHER PUBLICATIONS

Parker-Hannifin Corporation, Quick Coupling Products Catalog 3800 USA, Feb. 2014, www.parker.com/quickcouplings.

(Continued)

*Primary Examiner* — David Bochna
(74) *Attorney, Agent, or Firm* — McDonnell Boehnen Hulbert & Berghoff LLP

(57) ABSTRACT

An example fluid connection system includes: a fitting comprising one or more ears protruding radially outward; a coupling nut comprising at least one helical groove and one or more channels, wherein the one or more channels are configured to allow the one or more ears of the fitting to pass therethrough and reach the at least one helical groove as the coupling nut is slid axially relative to the fitting to mount the coupling nut to the fitting, and wherein the one or more ears are configured to rotationally traverse the at least one helical groove when rotating the coupling nut relative to the fitting, thereby pulling the coupling nut and the fitting toward each other; and an anti-rotation element configured to rotationally couple the fitting to the coupling nut when the coupling nut reaches a predetermined rotational position relative to the fitting.

17 Claims, 11 Drawing Sheets

(56) References Cited

U.S. PATENT DOCUMENTS

| | | | | |
|---|---|---|---|---|
| 806,665 | A | * | 12/1905 | Henderson et al. .... F16L 37/248 285/361 |
| 807,417 | A | * | 12/1905 | Caskey ................. F16L 37/113 285/377 |
| 808,446 | A | * | 12/1905 | Gill et al. ............. F16L 37/252 285/85 |
| 946,025 | A | * | 1/1910 | Elvin .................... F16L 37/252 285/271 |
| 980,677 | A | * | 1/1911 | Rhoads ................ F16L 37/252 285/86 |
| 1,128,474 | A | * | 2/1915 | Martz ................... F16L 37/252 285/376 |
| 1,232,193 | A | * | 7/1917 | Bowes, Jr. ............ F16L 37/252 285/376 |
| 1,415,157 | A | * | 5/1922 | Courchene ........... F16L 37/252 285/85 |
| 1,622,216 | A | * | 3/1927 | Anlauf ................. F16L 37/252 285/361 |
| 1,857,420 | A | * | 5/1932 | Warren ................ F16L 37/252 285/85 |
| 1,947,743 | A | * | 2/1934 | Schoeneck ........... F16L 37/252 285/91 |
| 2,111,859 | A | * | 3/1938 | Kennedy .............. F16L 37/252 285/361 |
| 3,365,219 | A | | 1/1968 | Nicolaus |
| 4,133,565 | A | * | 1/1979 | Shutt ................... F16L 37/113 285/334.5 |
| 4,260,180 | A | * | 4/1981 | Halushka ............. F16L 37/004 285/391 |
| 4,834,139 | A | | 5/1989 | Fitzgibbons |
| 6,312,020 | B1 | | 11/2001 | Ketcham et al. |
| 6,598,908 | B1 | * | 7/2003 | Wosik .................. F16L 19/055 285/332.3 |
| 7,914,050 | B2 | | 3/2011 | Udhofer et al. |
| 7,918,243 | B2 | | 4/2011 | Diodati et al. |
| 8,240,719 | B2 | | 8/2012 | Udhofer et al. |
| 8,529,249 | B2 | * | 9/2013 | Haskin .................. F23D 14/58 285/402 |
| 9,476,528 | B2 | | 10/2016 | Tiberghien et al. |
| 9,482,379 | B2 | | 11/2016 | Trent |
| 9,791,079 | B2 | | 10/2017 | Considine, Jr. et al. |
| 9,803,783 | B2 | | 10/2017 | Zulauf et al. |
| 9,822,913 | B2 | | 11/2017 | Considine, Jr. et al. |
| 2005/0023825 | A1 | * | 2/2005 | Nakamura ........... F16L 37/248 285/360 |
| 2005/0151370 | A1 | | 7/2005 | Vyse et al. |
| 2009/0184518 | A1 | * | 7/2009 | Nakamura ........... F16L 37/252 285/307 |
| 2019/0072220 | A1 | | 3/2019 | Willetts |
| 2019/0093800 | A1 | | 3/2019 | Jankin et al. |

OTHER PUBLICATIONS

Parker-Hannifin Corporation, Parker Universal Push to Connect Catalogue, BUL-4017-1-UK, Aug. 2012.
Aircraft Self-Locking Fluid Connection by JPB Systeme; downloaded from: https://www.jpb-systeme.com/ELS.php on Oct. 22, 2019.

* cited by examiner

1800

1802 ALIGNING A FITTING TO A COUPLING NUT, WHEREIN THE FITTING INCLUDES ONE OR MORE EARS PROTRUDING RADIALLY OUTWARD FROM THE FITTING, WHEREIN THE COUPLING NUT INCLUDES ONE OR MORE INTERIOR ANNULAR GROOVES AND ONE OR MORE CHANNELS, WHEREIN ALIGNING THE FITTING TO THE COUPLING NUT INCLUDES ALIGNING THE ONE OR MORE EARS WITH THE ONE OR MORE CHANNELS

1804 AXIALLY MOVING THE COUPLING NUT RELATIVE TO THE FITTING SUCH THAT THE ONE OR MORE EARS OF THE FITTING TRAVERSE THE ONE OR MORE CHANNELS AND REACH THE ONE OR MORE INTERIOR ANNULAR GROOVES OF THE COUPLING NUT

1806 ROTATING THE COUPLING NUT RELATIVE TO THE FITTING, THEREBY CAUSING THE ONE OR MORE EARS TO ROTATIONALLY TRAVERSE THE ONE OR MORE INTERIOR ANNULAR GROOVES, WHEREIN THE FITTING INCLUDES A FIRST ANTI-ROTATION FEATURE AND THE COUPLING NUT INCLUDES A SECOND ANTI-ROTATION FEATURE, WHEREIN THE FIRST ANTI-ROTATION FEATURE IS MISALIGNED WITH THE SECOND ANTI-ROTATION FEATURE WHEN THE ONE OR MORE EARS ARE ALIGNED WITH THE ONE OR MORE CHANNELS, AND WHEREIN ROTATING THE COUPLING NUT RELATIVE TO THE FITTING INCLUDES ROTATING THE COUPLING NUT UNTIL THE FIRST ANTI-ROTATION FEATURE IS ALIGNED WITH THE SECOND ANTI-ROTATION FEATURE

1808 ENGAGING AN ANTI-ROTATION ELEMENT WITH THE FIRST ANTI-ROTATION FEATURE AND THE SECOND ANTI-ROTATION FEATURE, THEREBY ROTATIONALLY COUPLING THE FITTING TO THE COUPLING NUT AND PRECLUDING RELATIVE ROTATION THEREBETWEEN

FIG. 18

FLUID CONNECTION SYSTEMS

CROSS REFERENCE TO RELATED APPLICATION

The present application claims priority to U.S. Provisional patent application No. 62/988,663 filed on Mar. 12, 2020, and entitled "Fluid Connection Systems," the entire contents of which are herein incorporated by reference as if fully set forth in this description.

BACKGROUND

In fluid systems, tubes, pipes, and hoses can be used to transfer different types of fluids from one location to another. Fittings are used to connect or adapt pipes, tubes, or hoses together to form the single line or to connect manifolds and equipment. In some instances, the mating tube or manifold can have a nut with threads that engage the corresponding threads of a fitting or adaptor. In examples, these threads can be tapered threads, and the tapered threads are used to create a mechanical seal connection between the fitting with tapered threads and the nut. In these examples, a large wrench or power equipment can be used to apply a large torque to tighten the threads.

Applying such a large torque by an operator can be challenging. For instance, the fitting can be disposed at a tight space where inserting a wrench is difficult. Further, applying such large torques can lead to operator fatigue.

Further, galling of the threads can occur with the application of large forces and the inherent nature of the mechanical metal-to-metal seal of tapered threads. Galling occurs as a result of friction between the threads of the fitting and corresponding threads in the nut. Such friction can cause cold- or friction-welding. When the fitting has cold- or friction-welded, it might not be possible to remove the fitting from the nut, thereby causing rework or replacement.

Conversely, under-torqueing the fitting-nut connection (e.g., torqueing the nut to a torque level that is less than a recommended torque level) can cause the connection to be loose and leakage to occur. Further, during operation of a fluid system, pressure and or vibration in the tubes, pipes, or hoses can cause the fitting to rotate, thereby loosening the threaded connection between the fitting and the nut. With a loose connection, fluid leakage can occur at the fitting, thereby leading to efficiency loss or loss of primary function of the system that includes the fitting.

Therefore, it may be desirable to have a fluid connection system with a fitting that can be connected to a mating component (e.g., a nut coupled to a tube, hose, manifold, etc.) without using threads, while maintaining a sealed connection that precludes fluid leakage. It may also be desirable to couple the fitting to the nut with minimal torque such that hand assembly is possible. It is with respect to these and other considerations that the disclosure made herein is presented.

SUMMARY

The present disclosure describes implementations that relate to fluid connection systems.

In a first example implementation, the present disclosure describes a fluid connection system. The fluid connection system includes: (i) a fitting comprising one or more ears protruding radially outward; (ii) a coupling nut comprising an interior annular groove and one or more channels, wherein the one or more channels are configured to allow the one or more ears of the fitting to pass therethrough and reach the interior annular groove as the coupling nut is slid axially relative to the fitting to mount the coupling nut to the fitting, and wherein the one or more ears are configured to rotationally traverse the interior annular groove when rotating the coupling nut relative to the fitting; and (iii) an anti-rotation element configured to rotationally couple the fitting to the coupling nut when the coupling nut reaches a predetermined rotational position relative to the fitting, such that the anti-rotation element precludes relative rotation between the fitting and the coupling nut.

In a second example implementation, the present disclosure describes a method. The method includes: (i) aligning a fitting to a coupling nut, wherein the fitting includes one or more ears protruding radially outward from the fitting, wherein the coupling nut includes one or more interior annular grooves and one or more channels, wherein aligning the fitting to the coupling nut includes aligning the one or more ears with the one or more channels; (ii) axially moving the coupling nut relative to the fitting such that the one or more ears of the fitting traverse the one or more channels and reach the one or more interior annular grooves of the coupling nut; (iii) rotating the coupling nut relative to the fitting, thereby causing the one or more ears to rotationally traverse the one or more interior annular grooves, wherein the fitting includes a first anti-rotation feature and the coupling nut includes a second anti-rotation feature, wherein the first anti-rotation feature is misaligned with the second anti-rotation feature when the one or more ears are aligned with the one or more channels, and wherein rotating the coupling nut relative to the fitting comprises rotating the coupling nut until the first anti-rotation feature is aligned with the second anti-rotation feature; and (iv) engaging an anti-rotation element with the first anti-rotation feature and the second anti-rotation feature, thereby rotationally coupling the fitting to the coupling nut and precluding relative rotation therebetween.

In a third example implementation, the present disclosure describes a fluid connection system. The fluid connection system includes: (i) a fitting comprising one or more ears protruding radially outward; (ii) a coupling nut comprising at least one helical groove and one or more channels, wherein the one or more channels are configured to allow the one or more ears of the fitting to pass therethrough and reach the at least one helical groove as the coupling nut is slid axially relative to the fitting to mount the coupling nut to the fitting, and wherein the one or more ears are configured to rotationally traverse the at least one helical groove when rotating the coupling nut relative to the fitting, thereby pulling the coupling nut and the fitting toward each other; and (iii) an anti-rotation element configured to rotationally couple the fitting to the coupling nut when the coupling nut reaches a predetermined rotational position relative to the fitting, such that the anti-rotation element precludes relative rotation between the fitting and the coupling nut.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode

FIG. 2A illustrates a perspective view of a fitting and a coupling nut, each having respective channels and ears, in accordance with an example implementation.

FIG. 18 is a flowchart of a method for assembling a fluid connection system, in accordance with an example implementation.

DETAILED DESCRIPTION

Figure 1:
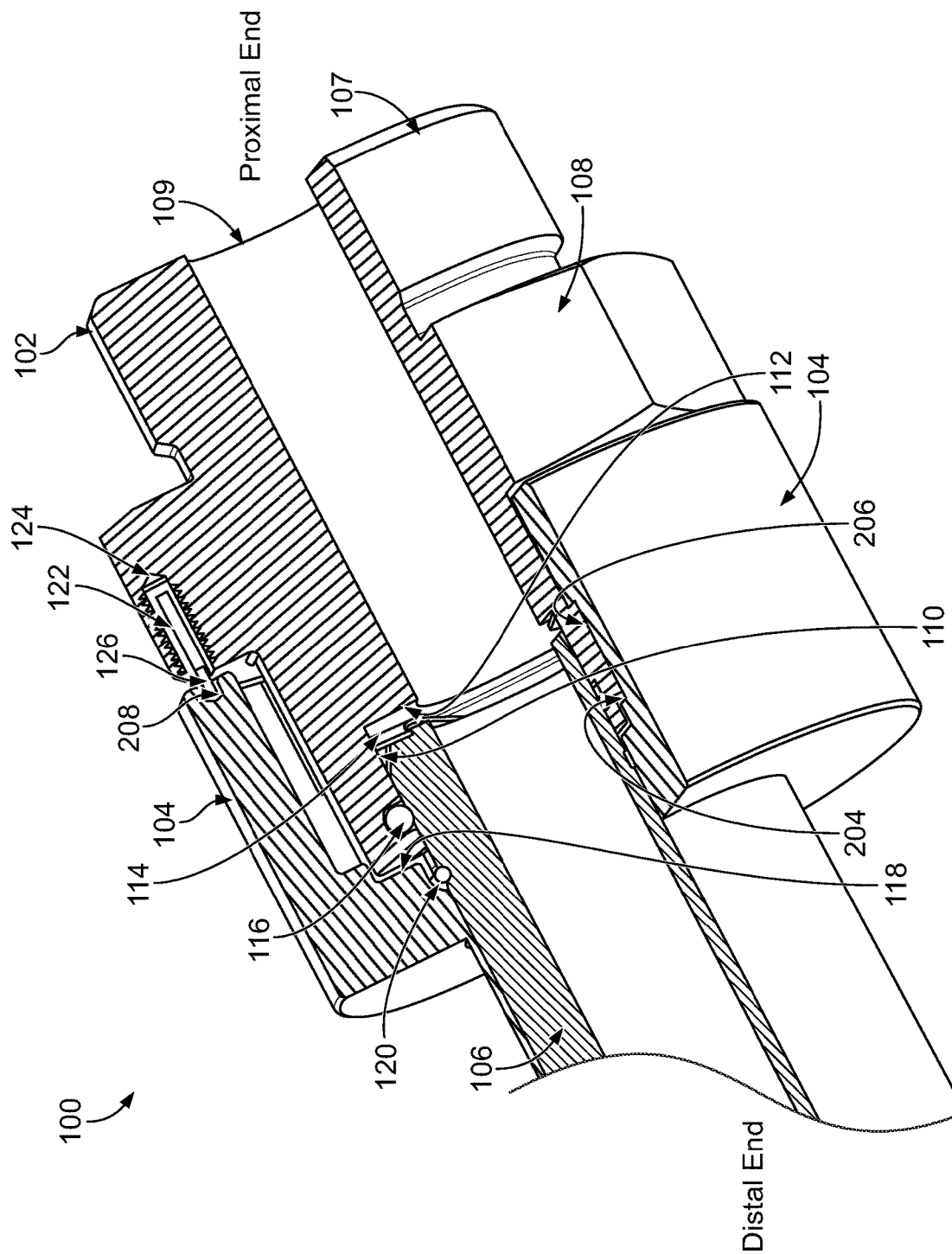
FIG. 1 illustrates a perspective cutaway view of a fluid connection system, in accordance with an example implementation.

A fitting is used in fluid systems to connect pipes, tubes, or hoses to each other or to couple pipes, tubes or hoses to a manifold or equipment. The term "fluid" is used herein as including any gas or liquid. The term "fluid line" is used generally throughout the disclosure to encompass a pipe, tube, or hose.

Fittings have several types and shapes. For example, an elbow fitting is installed between two lengths of pipe (or tubing) to allow a change of direction, e.g., usually a 90° or 45° angle. Ends of an elbow fitting can be machined for butt welding, threaded (e.g., female threads), or socketed. When the ends differ in size, the elbow fitting can be referred to as a reducing (or reducer) elbow fitting. A coupling fitting is configured to connect two pipes. If sizes of the pipes differ, the fitting is known as a reducing coupling, reducer, or an adapter. Other types of fittings include union fittings, nipple fittings, reducer fitting, double-tapped bushing fitting, tee fitting, diverter fitting, as examples.

When installing a piping or plumbing system, it is desirable to have fittings that are leak-proof and make reliable connections. Several connection methods can be used to couple fluid lines to a fitting include welding and threading. In examples, threads are used to make a connection that can withstand high pressure levels. In these examples, a threaded nut pipe can have a screw thread at one or both ends for assembly. For instance, a steel pipe can be joined with threaded connections where tapered threads are cut or machined into the end of the fitting. A sealant can be applied in the form of thread-sealing compound or thread seal tape and the fitting is threaded into another fluid line having a threaded nut or into a manifold using a wrench.

Tapered threads are used in high pressure application because tapered threads create a seal due to the thread crest to root interference, assisted by the thread seal tape. In contrast, parallel threads include connecting surfaces that are flat-machined, and a sealing ring is used between the fitting and the fluid line.

In example applications where high pressure fluids are being transferred through fluid lines, connecting these fluid lines with fittings can involve tightening the threads of the fitting and the nut with a high torque applied with a pipe wrench or power equipment. For example, for a fitting having 1.5-2 inch diameter, torques of 200-500 pound-foot (lbs-ft) can be applied to make a tight threaded connection and achieve a leak-proof connection. Such high torques can be difficult to achieve manually, and in some application where the fitting is disposed in tight spaces, it may be difficult to insert a wrench in such tight spaces to tighten the fitting. Under-torqueing the fitting to a torque level below a recommended torque level can cause leakage.

Further, relying on a tight threaded connection to preclude or limit leakage can cause some performance deterioration overtime. For instance, if the fitting is used in a high pressure application or if the fitting and the fluid lines are subjected to vibrations during operation, "hose kicking" can occur, where the fitting can rotate, thereby loosening the threaded connection between the fitting and the fluid lines the fitting is connecting together. As a result of such loosening, galling can occur as the thread surfaces of the fitting and respective thread surface of the fluid lines slide relative to each other.

Therefore, it may desirable, to have a fluid connection system between a fitting and a nut of a fluid line that precludes leakage without using a threaded connection of the fitting with the nut. Disclosed herein are methods, systems, fittings, assemblies, and fluid connection systems that involve using no or minimal torque to connect a fitting to a nut of a fluid line. The disclosed configurations involve having features that axially retain the fitting to the nut of the fluid line and anti-rotation features and elements that preclude rotation of the fitting once the fluid connection is made. With the disclosed configurations, a low torque to no torque hydraulic connection that can be hand-assembled can be made. The fluid connection system can include a dynamic radial seal to preclude leakage at high pressure levels.

FIG. 1 illustrates a perspective cutaway view of a fluid connection system 100, in accordance with an example implementation. The fluid connection system 100 includes a fitting 102 and a coupling nut 104. The coupling nut 104 is configured to be mounted to a fluid line 106 (e.g., a tube or hose). A distal end of the fitting 102 is coupled to the nut, whereas a proximal end 107 of the fitting 102 can couple the fluid line 106 and the coupling nut 104 to another fluid line or manifold. In examples, the proximal end 107 can be configured with the same features of the distal end of the fitting 102 that are described below.

The fitting 102 has a fitting body 108 that is generally cylindrical. The fitting body 108 can have any configuration that renders the fitting 102 any type of fitting, e.g., an elbow fitting, a straight fitting, union fitting, a T-fitting, etc. The fitting body 108 includes or defines a longitudinal cylindrical cavity 109 therein. The longitudinal cylindrical cavity 109 of the fitting body 108 operates as a fluid passage that allows fluid flow therethrough.

The fitting body 108 includes a counterbore 110 that forms an annular shoulder 112. The fitting 102 further includes a spring 114. The spring 114 is depicted as a wave spring as an example for illustration only. Other types of springs (e.g., a coil spring) can be used. The spring 114 has a proximal end that rests, or is secured, against the annular shoulder 112 of the fitting body 108, whereas a distal or second end of the spring 114 rests against a proximal end of the fluid line 106.

The fitting 102 also includes an interior annular groove formed in an interior surface of the fitting body 108 and configured to receive a radial seal 116 (e.g., an O-ring) therein. In examples, an anti-extrusion backup ring can be disposed in the interior annular groove containing the radial seal 116 to reduce wear of the radial seal 116 and allow the fluid connection system 100 to be used in high pressure fluid applications.

The radial seal 116 is disposed between the interior peripheral surface of the counterbore 110 and the exterior peripheral of the fluid line 106. Pressurized fluid flow through the longitudinal cylindrical cavity 109 of the fitting body 108 squeezes or applies compression on an outside diameter and an inside diameter of the radial seal 116. The radial seal 116 thus seals an annular space between the interior peripheral surface of the counterbore 110 and the exterior peripheral surface of the fluid line 106. As such, fluid flowing through the fitting body 108 might not leak to an external environment of the fluid connection system 100. The radial seal 116 can be configured as a dynamic seal to maintain an effective seal during operation of the fluid connection system 100.

The coupling nut 104 can include a stepped interior surface 118 forming a shoulder against which a distal end of the fitting body 108 can rest. As depicted in FIG. 1, the fluid line 106 can have an exterior annular groove in which a retaining ring 120 can be disposed. The retaining ring 120 interacts with an interior surface of the coupling nut 104 to axially retain the coupling nut 104 to the fluid line 106. Once the fitting 102 is coupled to the coupling nut 104 and the fluid line 106, the spring 114 applies a biasing force on the fluid line 106 in a distal direction to push the retaining ring 120 against the interior surface of the coupling nut 104, thereby precluding axial slop. With this configuration, the effects of pressure impulses resulting from pressure variation in fluid flowing through the fluid connection system 100 can be reduced.

The fitting 102 is configured to couple to the fluid line 106 and the coupling nut 104 without using threads. Particularly, the fluid connection system 100 is configured such that the fitting 102 and the coupling nut 104 can be aligned in a particular orientation, then slid axially relative to each other until a particular axial position, then rotated relative to each other to a predetermined rotational position where they are rotatably locked to each other, thereby precluding the fitting 102 from backing out or being disassembled from the coupling nut 104. The term "relative to" is used throughout the disclosure to indicate that (i) the fitting 102 can be moved axially or rotationally while the coupling nut 104 is stationary, (ii) the coupling nut 104 can be moved axially or rotationally while the fitting 102 is stationary, or (iii) both the fitting 102 and the coupling nut 104 can be moved toward each other or rotationally about each other.

Particularly, the fluid connection system 100 includes an anti-rotation configuration (e.g., anti-rotation features and elements) that preclude the fitting 102 from rotating back relative to the coupling nut 104 once the fitting 102 reaches a desired rotational position. This way, the fitting 102 is coupled to the fluid line 106 and the coupling nut 104 such that the fitting 102 is both axially and rotatably retained to the coupling nut 104 using minimal torque and without threads.

Figure 2:
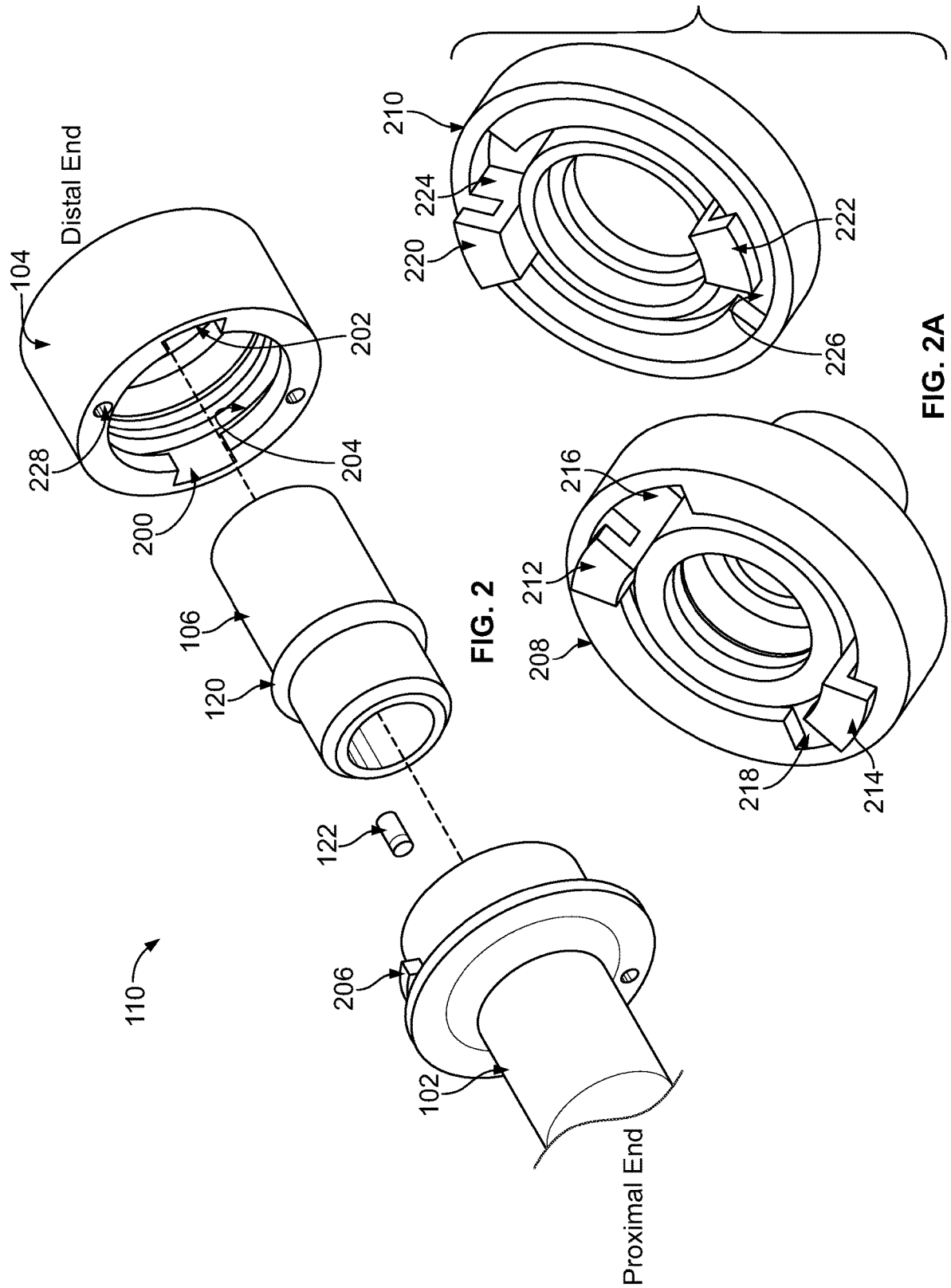
FIG. 2 illustrates a partial exploded view of the fluid connection system of FIG. 1, in accordance with an example implementation.

FIG. 2 illustrates a partial exploded view of the fluid connection system 100, in accordance with an example implementation. The fitting 102 is shown schematically or in a simplified configuration in FIG. 2 (e.g., without showing hexagonal outline of the fitting body 108); however, it should be understood that it represents the fitting 102 of FIG. 1.

As shown in FIG. 2, the coupling nut 104 can include one or more channels such as channel 200 and channel 202 formed as axial recessed areas or axial grooves in an interior surface of the coupling nut 104. The coupling nut 104 further includes an interior annular groove 204 disposed in the interior surface of the coupling nut 104.

The interior annular groove 204 is bounded by a proximal side wall and a distal side wall. The channels 200, 202 extend axially from a proximal end face of the coupling nut 104 to the proximal side wall of the interior annular groove 204.

The fitting 102 can include one or more bosses or ears, such as ear 206, projecting or protruding radially outward from an exterior surface of the fitting 102 and corresponding to the channels 200, 202. The term "ear" is used herein to encompass a boss comprising a protruding feature (e.g., block) from the fitting or work piece.

To assemble the fitting 102 to the coupling nut 104, the coupling nut 104 (or the fitting 102 or) can be rotated until the ear 206 is rotationally aligned with the corresponding channel of the channels 200, 202. The coupling nut 104 can then be slid axially relative to the fitting 102 such that the ear 206 axially traverses the channel 200, 202 until the ear 206 reaches the interior annular groove 204. As the coupling nut 104 is moved axially relative to (or is slide over) the fitting 102, the spring 114 described above with respect to FIG. 1 is compressed.

The coupling nut 104 can then be rotated relative to the fitting 102 while the ear 206 rotationally traverses the interior annular groove 204. As the ear 206 rotates, it becomes no longer axially aligned with the channel 200 or the channel 202. The ear 206 thus becomes blocked from backing out axially by the proximal side wall of the interior annular groove 204. Further, the spring 114 applies its biasing force on the fitting 102 to push the ear 206 against the side wall of the interior annular groove 204. With this configuration, the fitting 102 is axially retained to the coupling nut 104 and the fluid line 106.

In other example implementations, multi-level ears can be used. For instance, the fitting 102 can two ears axially-spaced apart along a length of the fitting 102 and the coupling nut 104 can have two interior annular grooves axially-spaced apart. Each of the ears of the fitting 102 can be positioned within a respective groove of the coupling nut 104. Such configuration can increase the axial retention force between the fitting 102 and the coupling nut 104.

In yet another example implementation, both the fitting and the coupling nut can have respective ears and channels. FIG. 2A illustrates a perspective view of a fitting 208 and a coupling nut 210, each having respective channels and ears, in accordance with an example implementation. The fitting 208 can have ear 212, ear 214, channel 216, and channel 218. On the other hand, the coupling nut 210 can have ear 220, ear 222, channel 224, and channel 226.

For assembly, the fitting 208 can be placed facing the coupling nut 210 such that the ears 212, 214 are respectively aligned with the channels 224, 226 and the channels 216, 218 are aligned with the ears 220, 222. The coupling nut 210 can be slid over the fitting 208, then rotated relative to the fitting 208 such that the ears 212, 214, 220, 222 block axial movement of the coupling nut 210 relative to the fitting 208.

In any of the implementations described above, it may be desirable to preclude the coupling nut from rotating back relative to the fitting to preclude unintentional disassembly. For example, referring to implementation in FIGS. 1-2, it may be desirable to preclude the coupling nut 104 from rotating back to a rotational position where the ear 206 is realigned with the channel 200 or the channel 202, where at such position the coupling nut 104 can back out axially from the fitting 102.

Referring to FIGS. 1 and 2 together, the fluid connection system 100 can include an anti-rotation element such as an anti-rotation pin 122. For example, as shown in FIG. 1, the fitting body 108 can include an anti-rotation feature such as a tapped hole 124 (threaded hole) formed in the fitting body 108.

The anti-rotation pin 122 can have a body including threads on its exterior surface to allow the anti-rotation pin 122 to be threadedly coupled to the fitting 102. Further, the anti-rotation pin 122 includes a spring-loaded plunger 126 disposed within the anti-rotation pin 122 122. A spring disposed within the anti-rotation pin 122 pushes the spring-loaded plunger 126 toward the coupling nut 104.

Referring now to FIG. 2, the coupling nut 104 includes one or more respective anti-rotation features corresponding to the anti-rotation features of the fitting 102. For example, the coupling nut 104 can include one or more holes, grooves, slits, or indentations, such as indentation 228, formed in a proximal end face of the coupling nut 104. The channels 200, 202 are rotationally shifted relative to the indentation 228 such that when the fitting 102 is first aligned with the coupling nut 104 and the ear 206 is aligned with the channel 200 or the channel 202, the anti-rotation pin 122 and the spring-loaded plunger 126 are not aligned with the indentation 228. In such position, the spring-loaded plunger 126 is pushed inside the anti-rotation pin 122 and compresses the spring disposed therein.

As mentioned above, the coupling nut 104 can then be rotated to bring the ear 206 out of alignment with the channel 200 or the channel 202 and prevent the ear 206 from backing out axially from the fitting 102. Particularly, the coupling nut 104 can be rotated until the anti-rotation pin 122 is aligned with the indentation 228. At such position, the spring in the anti-rotation pin 122 pushes the spring-loaded plunger 126 toward the indentation 228. Once the spring-loaded plunger 126 is released into the indentation 228, the coupling nut 104 is rotationally locked to the fitting 102 and is precluded from rotating back.

With this configuration, the fitting 102 is axially and rotationally locked to the coupling nut 104 without using threads. The coupling nut 104 is thus precluded from rotating back to a position where the ear 206 is realigned with the channel 200 or the channel 202, and is thus precluded from back out axially or being disassembled from the fitting 102 during operation of the fluid connection system 100.

More than one anti-rotation pins can be used to rotatably lock the fitting 102 to the coupling nut 104. Also, more than one ear can be used to axially retain the fitting 102 to the coupling nut 104. Further, other types of anti-rotation features and elements can be used in addition or alternative to the anti-rotation pin 122 and the indentation 228 described above.

Figure 3:
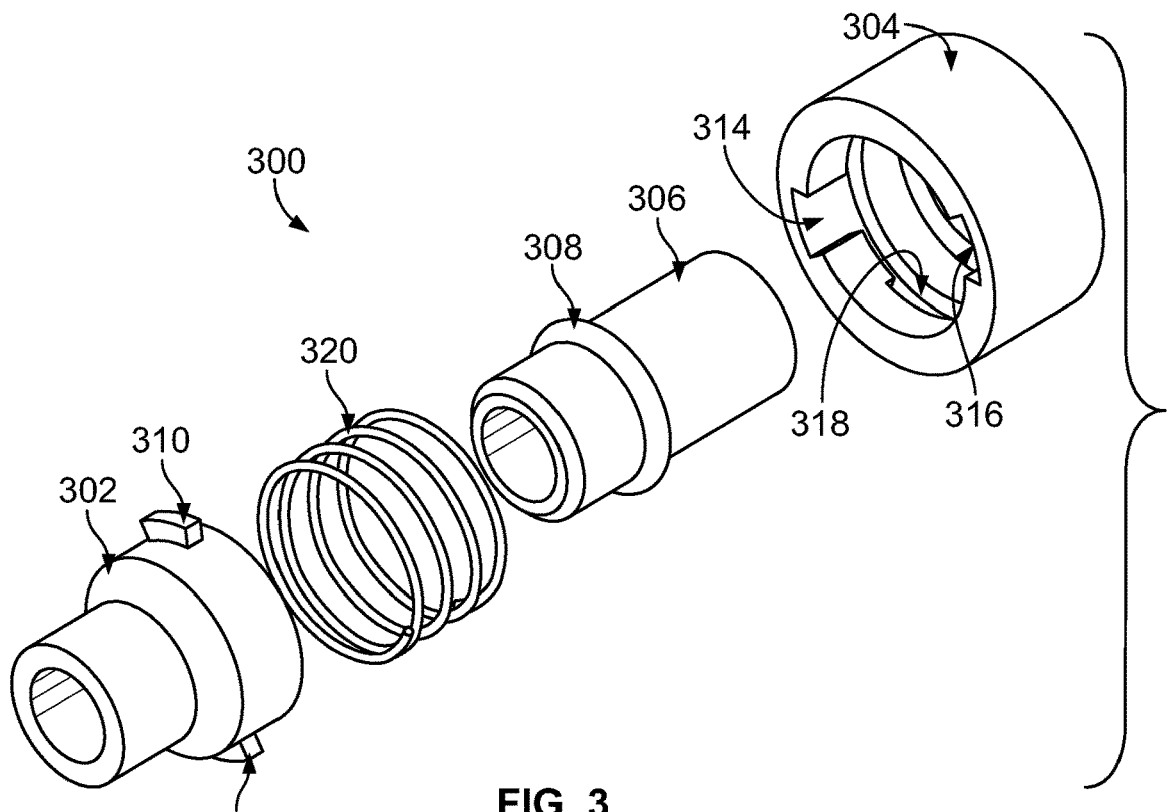
FIG. 3 illustrates an exploded view of a fluid connection system with a spring-based anti-rotation configuration, in accordance with an example implementation.
Figure 4:
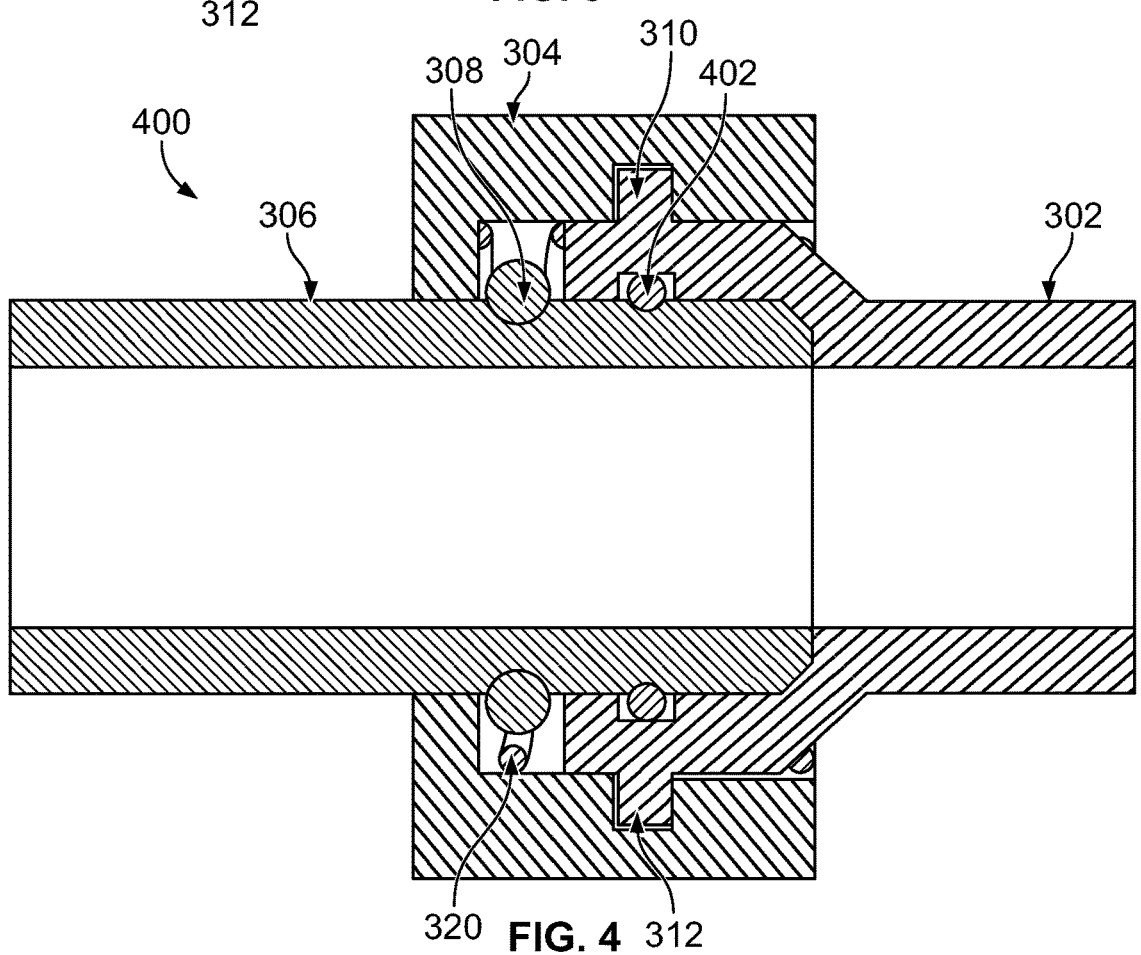
FIG. 4 illustrates a cross-sectional side view of an assembly of the fluid connection system of FIG. 3, in accordance with an example implementation.

FIG. 3 illustrates an exploded view of a fluid connection system 300 with a spring-based anti-rotation configuration, and FIG. 4 illustrates a cross-sectional side view of an assembly 400 of the fluid connection system 300, in accordance with an example implementation. FIGS. 3 and 4 are described together.

Similar to the fluid connection system 100, the fluid connection system 300 includes a fitting 302, a coupling nut 304, and a fluid line 306 (e.g., a tube or hose) to which the coupling nut 304 can be mounted. The fluid connection system 300 can also have a retaining ring 308 that, similar to the retaining ring 120, facilitates axial retention of the coupling nut 304 to the fluid line 306.

The fitting 302 can include one or more ears, such as ear 310 and ear 312, disposed in a circular array about a circumference of a fitting body of the fitting 302. The coupling nut 304 can include one or more channels such as channel 314 and channel 316 formed as axial grooves in an interior surface of the coupling nut 304. The channels 314, 316 correspond to and are configured to allow the ears 310, 312 to pass therethrough. The coupling nut 304 further includes an interior annular groove 318 disposed in the interior surface of the coupling nut 304.

The fluid connection system 300 further includes a spring 320 that is configured to be disposed between an end of the fitting 302 and an interior surface of the coupling nut 304. The spring 320 operates as an anti-rotation element as described below. The fluid connection system 300 further includes a radial seal 402 as shown in FIG. 4 that operates similar to the radial seal 116.

To assemble the fluid connection system 300, the coupling nut 304 can be mounted to fluid line 306, where the retaining ring 308 retain the coupling nut 304 to the fluid line in an axial direction. Then, the coupling nut 304 and the fluid line 306 can be assembled to the fitting 302. Particularly, the coupling nut 304 can be rotated relative to the fitting 302 until the ears 310, 312 are respectively aligned with the channels 314, 316. The coupling nut 304 can then be slid axially relative to or over the fitting 102 such that the ears 310, 312 axially traverse the channels 314, 316 until the ears 310, 312 reach the interior annular groove 318. As the coupling nut 304 is moved axially relative to the fitting 302, the spring 320 is compressed as shown in FIG. 4.

The coupling nut 304 can then be rotated relative to the fitting 302 in a first rotational direction to bring the ears 310, 312 out of alignment with the channels 314, 316 and prevent them from back out axially. As the coupling nut 304 is rotated, the spring 320 forces the ear 310, 312 against a side wall of the interior annular groove 318. The friction between the ears 310, 312 and the side wall of the interior annular groove 318 resulting from the force of the spring 320 can preclude the coupling nut 304 from rotating back in a second rotational direction opposite the first rotational direction to a position where the ears 310, 312 are realigned with the channels 314, 316. As such, the spring 320 may preclude the coupling nut 304 from backing out. This way, the spring 320 operates as an anti-rotation element. With this configuration, the fitting 302 is axially and rotationally locked to the coupling nut 304 without using threads.

Figure 5:
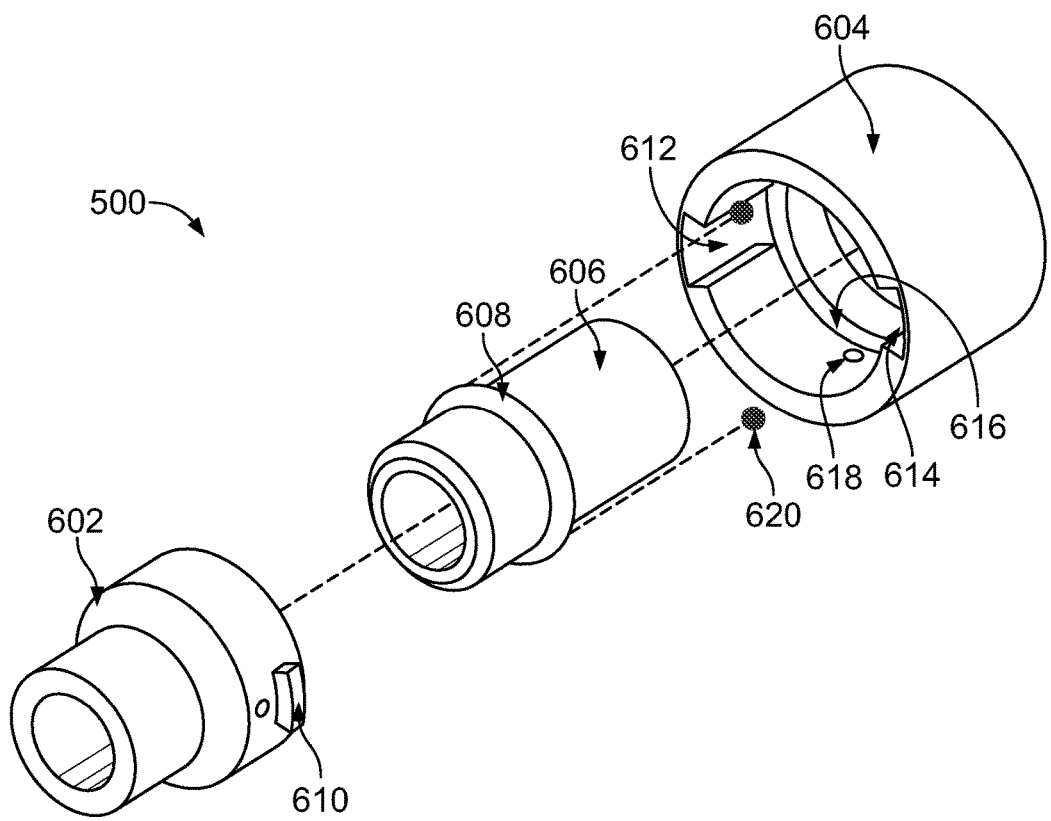
FIG. 5 illustrates an exploded view of a fluid connection system with a ball and indentation anti-rotation configuration, in accordance with an example implementation.
Figure 6:
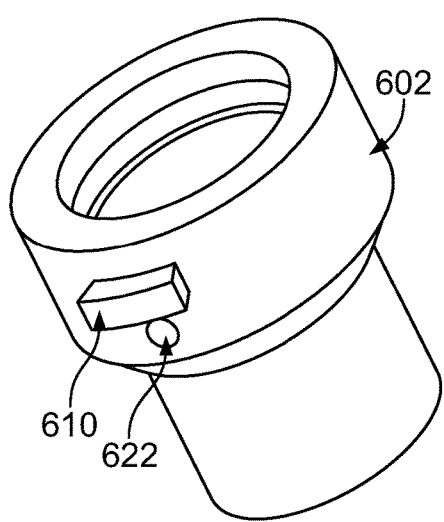
FIG. 6 illustrates a perspective view of a fitting of the fluid connection system of FIG. 5, in accordance with an example implementation.
Figure 7:
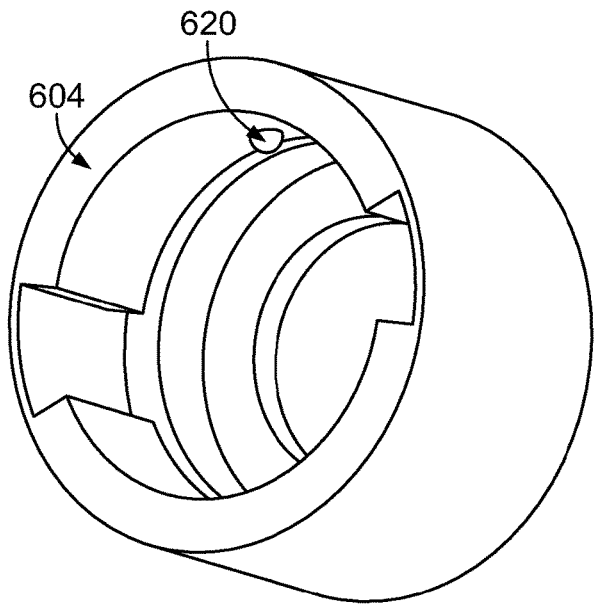
FIG. 7 illustrates a perspective view of a coupling nut of the fluid connection system of FIG. 5, in accordance with an example implementation.

FIG. 5 illustrates an exploded view of a fluid connection system 500 with a ball and indentation anti-rotation configuration, FIG. 6 illustrates a perspective view of a fitting 602 of the fluid connection system 500, and FIG. 7 illustrates a perspective view of a coupling nut 604 of the fluid connection system 500, in accordance with an example implementation. FIGS. 5-7 are described together.

The fluid connection system 500 includes a fluid line 606 and a retaining ring 608 that operate similar to their counterpart components in the fluid connection systems 100, 300. The fitting 602 includes at least one ear, such as ear 610. The coupling nut 604 includes channels 612, 614 and an interior annular groove 616 that all operate similar to their counterpart components the fluid connection systems 100, 300 to axially retain the fitting 602 to the coupling nut 604.

The anti-rotation configuration of the fluid connection system 500 involves anti-rotation features in the coupling nut 604 and the fitting 602 and an anti-rotation element. Particularly, the coupling nut 604 can have one or more indentations, such as indentation 618 that are spherical in shape to receive corresponding balls as anti-rotation elements, such as a ball 620 therein. The ball 620 is a flexible ball or a gasket ball made of a compressible material. The ball 620 can be retained within the indentation 618 by being press-fit therein or via an adhesive, for example.

In an example, the ball 620 can be placed into the corresponding indentation, e.g., the indentation 618, such that the ball 620 is protruding radially inward from an interior surface of the coupling nut 604. When the coupling nut 604 is slid axially about the fitting 602, the ball 620 is compressed.

The fitting 602 on the other hand also includes corresponding grooves or indentations, such as indentation 622. When the coupling nut 604 is rotated relative to the fitting 602 to a predetermined rotational position where the ball 620 is aligned with the indentation 622 of the fitting 602, the ball 620 is released into the indentation 622. Once in place between the indentations 618, 622, the ball 620 can preclude the coupling nut 604 from rotating back relative to the fitting 602. As such, the ball 620 is made of a material that is compressible or flexible to allow the ball 620 to be compressed while the coupling nut 604 is slid over the fitting 602, but is also sufficiently sturdy to preclude relative rotation between the coupling nut 604 and the fitting 602 once the ball 620 is released into the indentation 622.

If a higher rotational retention force is desired, the number of balls and indentation can be increased in a circular array about an interior surface of the coupling nut 604. Further, the configuration of the fitting 602 and the coupling nut 604 can be reversed such that the balls are first placed in the fitting 602, and are then released into corresponding indentations or grooves in the coupling nut 604 when rotationally aligned therewith. Further, other types of flexible elements or flexible inserts can be used instead of a ball.

Figure 8:
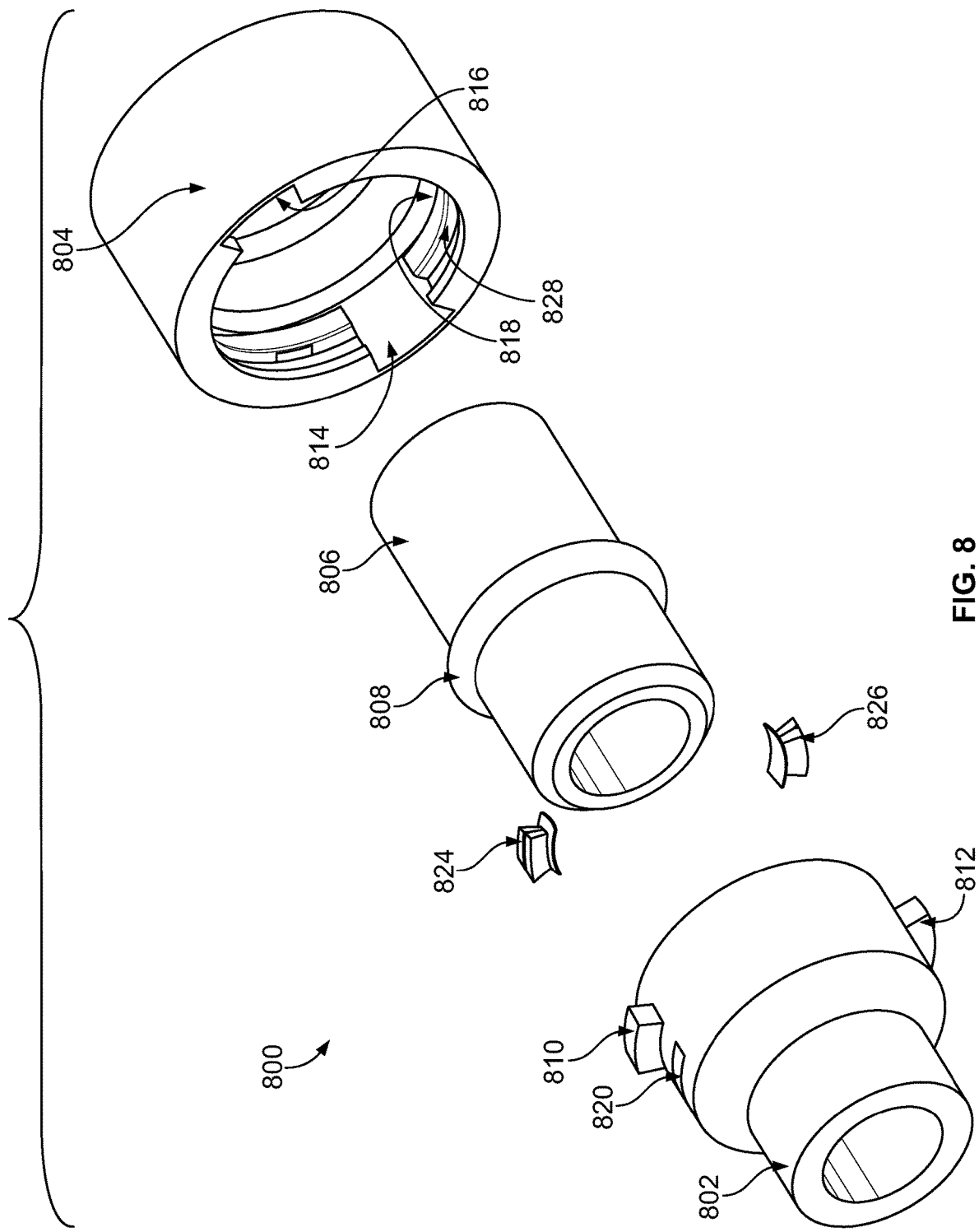
FIG. 8 illustrates an exploded view of a fluid connection system with a flexible insert and slit anti-rotation configuration, in accordance with an example implementation.
Figure 9:
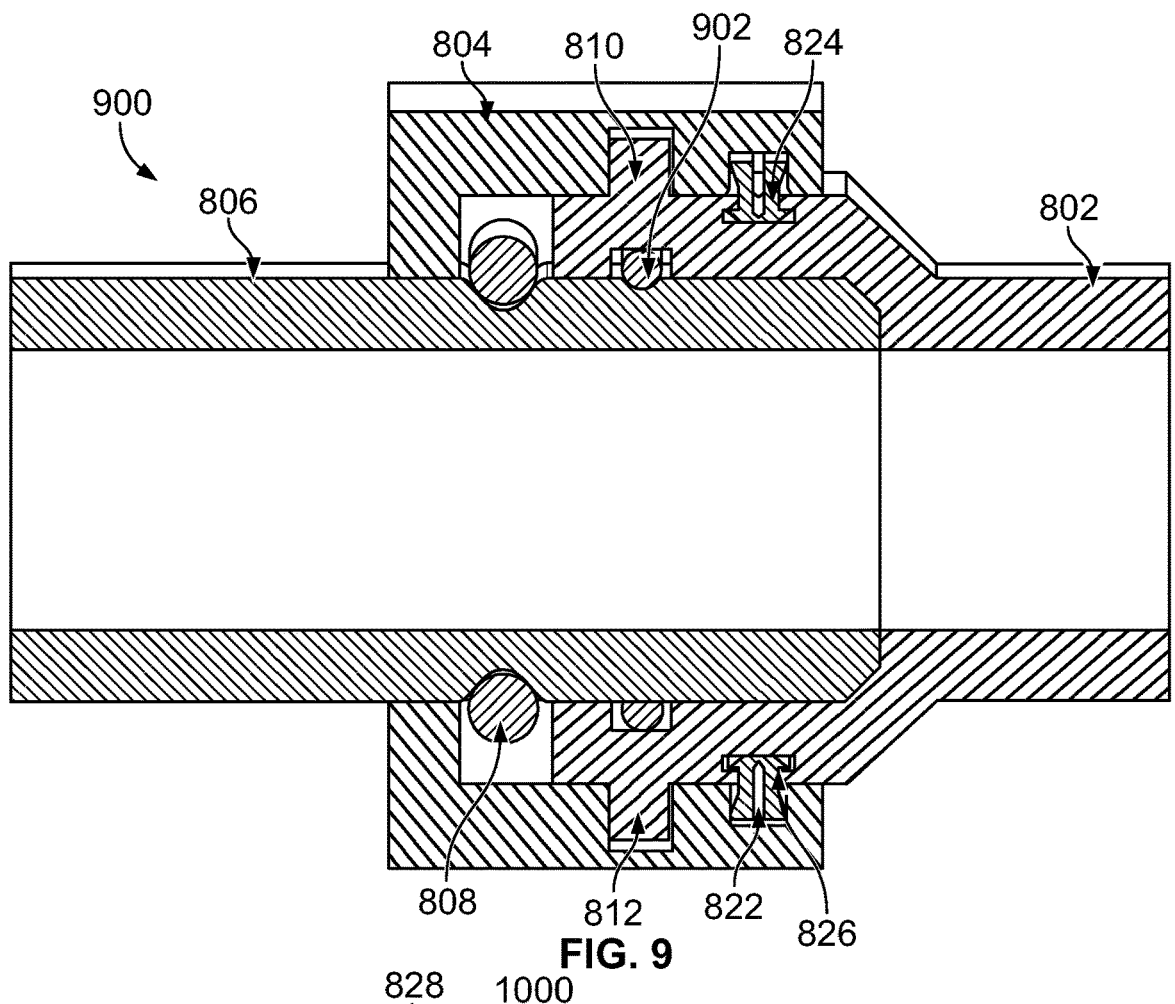
FIG. 9 illustrates a cross-sectional side view of an assembly of the fluid connection system of FIG. 8, in accordance with an example implementation.
Figure 10:
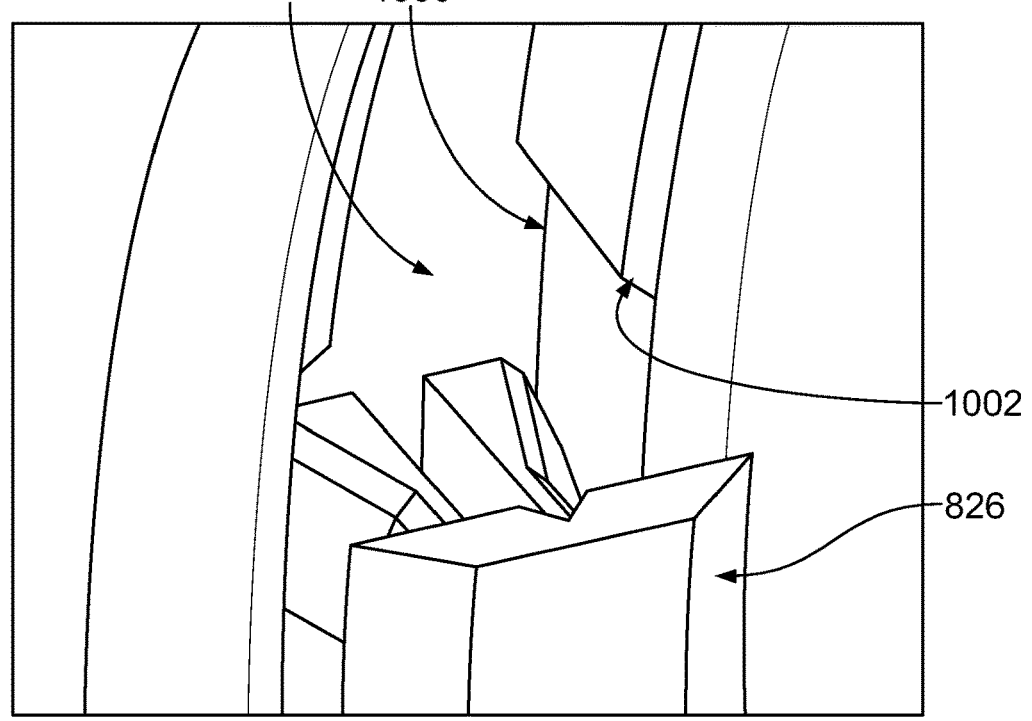
FIG. 10 illustrates a zoomed-in view of the fluid connection system of FIG. 8, in accordance with an example implementation.

FIG. 8 illustrates an exploded view of a fluid connection system 800 with a flexible insert and slit anti-rotation configuration, FIG. 9 illustrates a cross-sectional side view of an assembly 900 of the fluid connection system 800, and FIG. 10 illustrates a zoomed-in view of the fluid connection system 800, in accordance with an example implementation.

The fluid connection system 800 includes a fitting 802, a coupling nut 804, a fluid line 806, a retaining ring 808, a radial seal 902 as shown in FIG. 9 that all operate similar to their counterpart components in the fluid connection systems 100, 300, 500. The fitting 802 includes ear 810 and ear 812. The coupling nut 804 includes channels 814, 816 and an interior annular groove 818 that also operate similar to their counterpart components the fluid connection systems 100, 300, 500 to axially retain the fitting 802 to the coupling nut 804.

The anti-rotation configuration of the fluid connection system 800 involves anti-rotation features (e.g., grooves and slits) in the coupling nut 804 and the fitting 802 and an anti-rotation element (e.g., a flexible insert). Particularly, the fitting 802 can have grooves or slits 820, 822 configured to receive flexible inserts 824, 826, respectively, that are configured to be protruding radially outward from an exterior surface of the fitting 602. Similar to the ball 620, the flexible inserts 824, 826 can be made of flexible, compressible material. The flexible inserts 824, 826 can be retained within the slits 820, 822 by being press-fit therein or via an adhesive, for example.

On the other hand, the coupling nut 804 can include another interior annular groove 828 that is parallel to or axially-spaced from the interior annular groove 818. During assembly, the flexible inserts 824, 826 can be placed into the corresponding slits 820, 822, and when the coupling nut 804 is axially slid about the fitting 802, the flexible inserts 824, 826 are compressed. When the coupling nut 804 is moved axially until the ears 810, 812 reach the interior annular groove 818, the flexible inserts 824, 826 also reach and "fall" into the interior annular groove 828 and are released therein.

Additionally, the interior annular groove 828 can have recesses such as recess 1000 shown in FIG. 10 that forms a protrusion 1002 in the interior annular groove 828. This configuration causes the flexible inserts 824, 826 to slide within the interior annular groove 828 until they pass the recess 1000, and then they are precluded from rotating back by way of the protrusion 1002, thereby precluding the coupling nut 804 backing out of the fitting 802. As such, the flexible inserts 824, 824 and the interior annular groove 828 having the recess 1000 operate as anti-rotation mechanism that reduces the likelihood of the coupling nut 804 being disassembled from the fitting 802.

If higher rotational retention forces are desired, the number of flexible inserts can be increased in a circular array about an exterior surface of the fitting 802. Further, the configuration of the fitting 802 and the coupling nut 804 can be reversed such that the flexible inserts 824, 826 can first be placed in coupling nut 804, and are then released into corresponding annular groove in the fitting 802.

Figure 11:
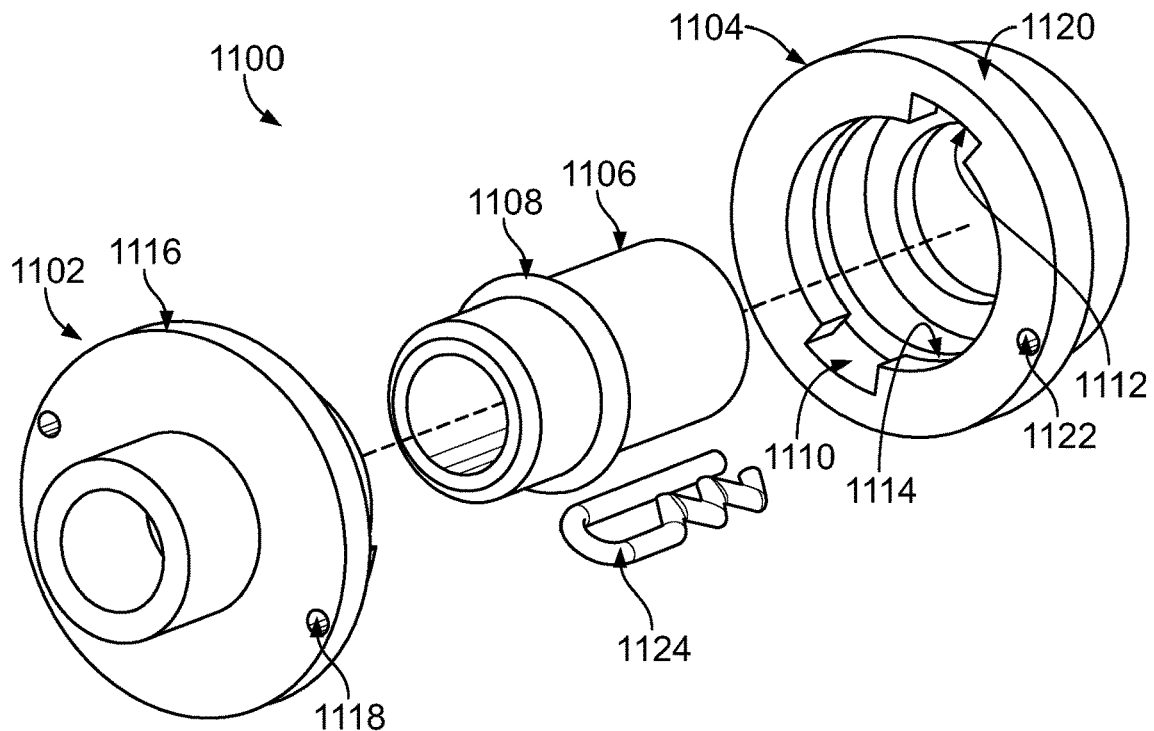
FIG. 11 illustrates an exploded view of a fluid connection system, in accordance with an example implementation.
Figure 12:
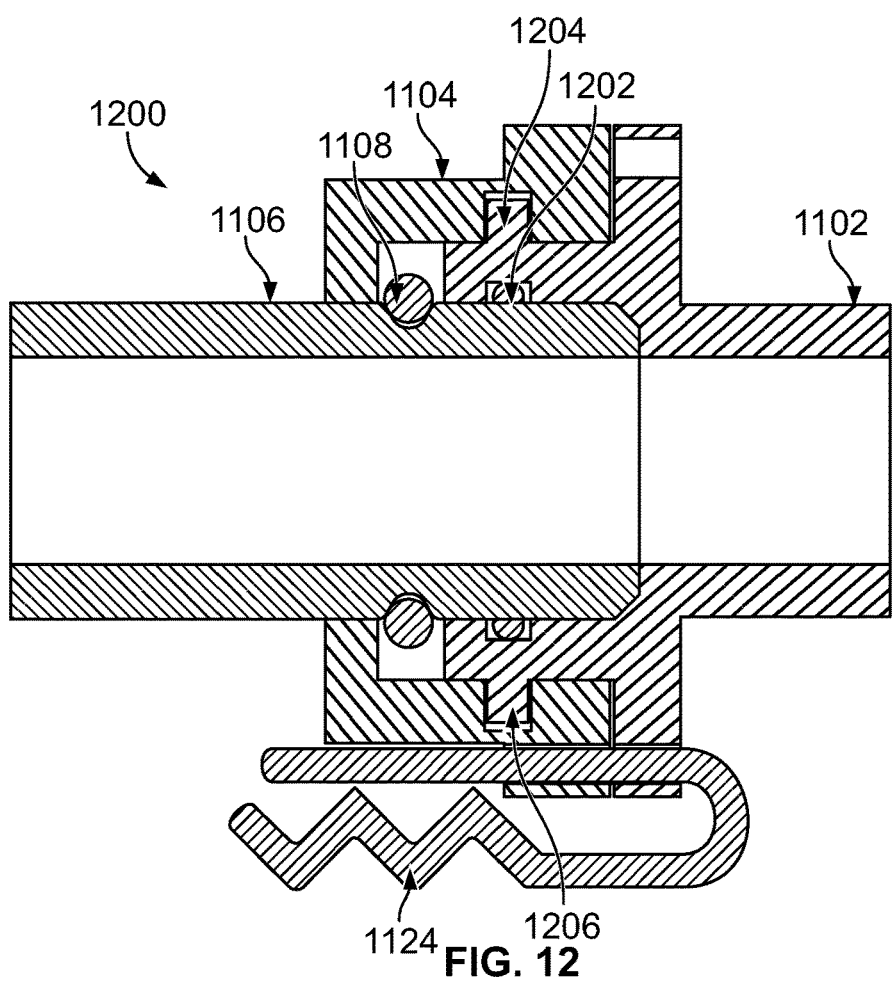
FIG. 12 illustrates a cross-sectional side view of an assembly of the fluid connection system of FIG. 11, in accordance with an example implementation.

FIGS. 11-12 illustrate another configuration with a pin (e.g., a cotter pin) used as an anti-rotation element. Particularly, FIG. 11 illustrates an exploded view of a fluid connection system 1100, and FIG. 12 illustrates a cross-sectional side view of an assembly 1200 of the fluid connection system 1100, in accordance with an example implementation. FIGS. 11-12 are described together.

The fluid connection system 1100 includes a fitting 1102, a coupling nut 1104, a fluid line 1106, a retaining ring 1108, a radial seal 1202 as shown in FIG. 12 that all operate similar to their counterpart components in the fluid connection systems described above. The fitting 1102 includes ear 1204 and ear 1206 shown in FIG. 12. The coupling nut 1104 includes channels 1110, 1112, and an interior annular groove 1114 that also operate similar to their counterpart components the fluid connection systems described above to axially retain the fitting 1102 to the coupling nut 1104.

The anti-rotation configuration of the fluid connection system 1100 involves holes in the coupling nut 1104 and the fitting 1102 as anti-rotation features and a cotter pin as an anti-rotation element. The fitting 1102 can have flanged portion 1116 that includes a through-hole 1118. On the other hand, the coupling nut 1104 can also have a flanged portion 1120 that includes a through-hole 1122.

During assembly, when the ears 1204, 1206 are aligned with the channels 1110, 1112 and the coupling nut 1104 is axially slid over the fitting 1102, the through-hole 1118 is misaligned with the through-hole 1122. The coupling nut 1104 can then be rotated relative to the fitting 1102 to a predetermined rotational position where the through-hole 1118 is aligned with the through-hole 1122.

The fluid connection system 1100 also includes a pin, such as cotter pin 1124. The cotter pin 1124 can be configured as a metal fastener with two tines that are bent during installation, similar to a staple or rivet. The cotter pin 1124 can be made of thick wire with a half-circular cross section, for example. Once the through-holes 1118, 1122 are aligned, the cotter pin 1124 can be inserted therethrough, thereby coupling the fitting 1102 to the coupling nut 1104 and prevent relative rotation therebetween. More than one cotter pin (and more corresponding through-holes) can be used if higher rotational retention forces are desired.

Figure 13:
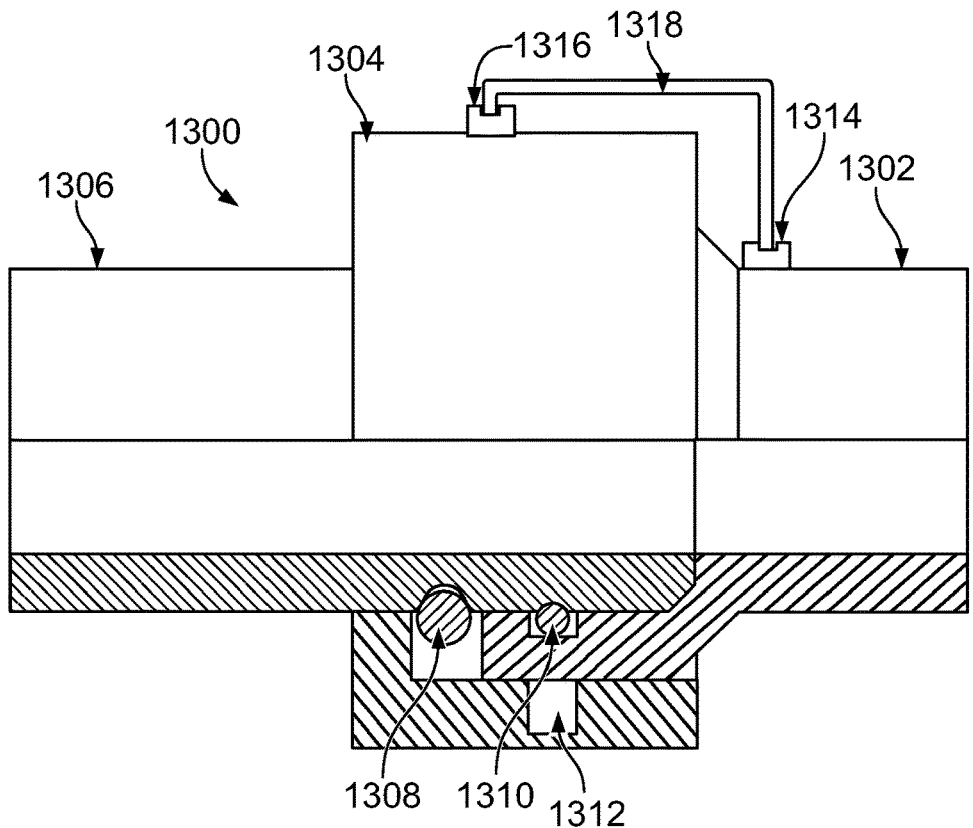
FIG. 13 illustrates a partial cross-sectional side view of an assembly of a fluid connection system having a clasp configured as an anti-rotation element, in accordance with an example implementation.

FIG. 13 illustrates a partial cross-sectional side view of an assembly 1300 of a fluid connection system having a clasp configured as an anti-rotation element, in accordance with an example implementation. The assembly 1300 includes a fitting 1302, a coupling nut 1304, a fluid line 1306, a retaining ring 1308, a radial seal 1310 that all operate similar to their counterpart components in the fluid connection systems described above.

The fitting 1302 includes ears such as ear 1312. The coupling nut 1304 includes channels and an interior annular groove that also operate similar to their counterpart components the fluid connection systems described above to axially retain the fitting 1302 to the coupling nut 1304.

The anti-rotation features of the assembly 1300 include a slot 1314 in the fitting 1302 and a corresponding slot 1316 in the coupling nut 1304. The anti-rotation element of the assembly 1300 is a clasp 1318 configured as an external fastener or external lock that prevents relative rotation between the fitting 1302 and the coupling nut 1304 after being assembled. The clasp 1318 can be a separate component or can be pre-assembled into the coupling nut 1304 or the fitting 1302.

During assembly, when the ear 1312 is aligned with the corresponding channel in the coupling nut 1304 and the coupling nut 1304 is axially slid over the fitting 1302, the slot 1314 is rotationally misaligned with the slot 1316. The coupling nut 1304 can then be rotated relative to the fitting 1302 to a predetermined rotational position where the slot 1314 is aligned with the slot 1316.

Assuming the clasp 1318 is pre-assembled to the fitting 1302 (e.g., "hooked" or placed in the slot 1316), once the slots 1314, 1316 are aligned, the clasp 1318 can be placed into the slot 1314 of the coupling nut 1304 to rotationally lock the coupling nut 1304 to the fitting 1302 and prevent relative rotation therebetween. In addition to operating as an anti-rotation element, the clasp 1318 further provides a visual indication to the operator assembling the fluid connection system that the fitting 1302 is assembled to the coupling nut 1304 and the assembly 1300 is ready for use.

Figure 14:
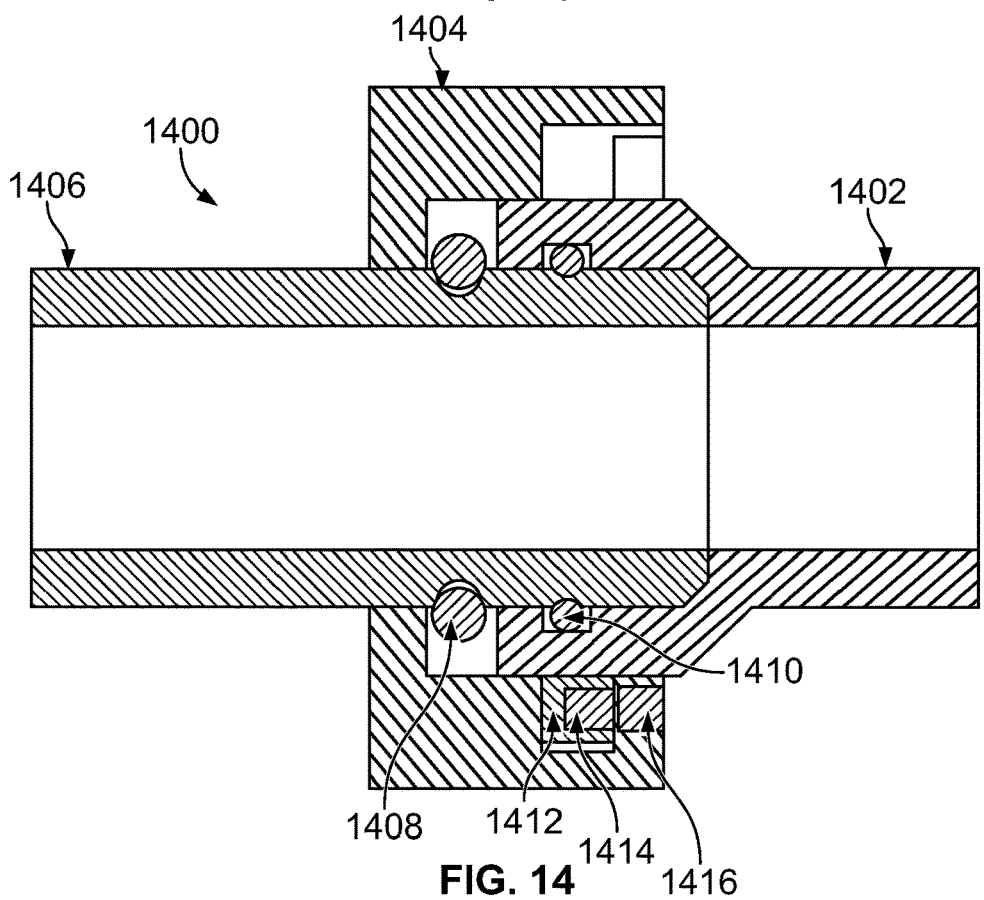
FIG. 14 illustrates a partial cross-sectional side view of an assembly of a fluid connection system having magnets configured as anti-rotation elements, in accordance with an example implementation.

FIG. 14 illustrates a partial cross-sectional side view of an assembly 1400 of a fluid connection system having magnets configured as anti-rotation elements, in accordance with an example implementation. The assembly 1400 includes a fitting 1402, a coupling nut 1404, a fluid line 1406, a retaining ring 1408, a radial seal 1410 that all operate similar to their counterpart components in the fluid connection systems described above.

The fitting 1402 includes at least one ear such as ear 1412. The coupling nut 1404 includes channels and an interior annular groove that also operate similar to their counterpart components the fluid connection systems described above to axially retain the fitting 1402 to the coupling nut 1404.

The anti-rotation features of the assembly 1400 include a magnet slot in the fitting 1402 having a magnet 1414 fixedly retained therein, and a corresponding magnet slot in the coupling nut 1404 having a magnet 1416 fixedly retained therein. The magnets 1414, 1416 can be retained within their respective magnets slots by being press-fit therein, via an adhesive, or can be screwed in the slots, as examples. As an example implementation, the magnet 1414 can be positioned in the ear 1412 of the fitting 1402; however, in other implementations, the magnet 1414 can be placed in other parts of the fitting 1402.

During assembly, when the ear 1412 is aligned with the corresponding channel in the coupling nut 1404 and the coupling nut 1404 is axially slid over the fitting 1402, the magnet 1414 is rotationally misaligned with the magnet 1416. The coupling nut 1404 can then be rotated relative to the fitting 1402 to a predetermined rotational position where the magnet 1414 is aligned with the magnet 1416.

The magnets 1414, 1416 are positioned in particular orientations such that opposite magnetic poles face each other when the magnets 1414, 1416 are aligned. This way, when the magnets 1414, 1416 are aligned, they attract each other, thereby generating a magnetic retention force having a shearing component and a tension component. The shearing component precludes the coupling nut 1404 from rotating back relative to the fitting 1402, and the tension component adds further axial retention that precludes or reduces any axial slop between the fitting 1402 and the coupling nut 1404.

Figure 15:
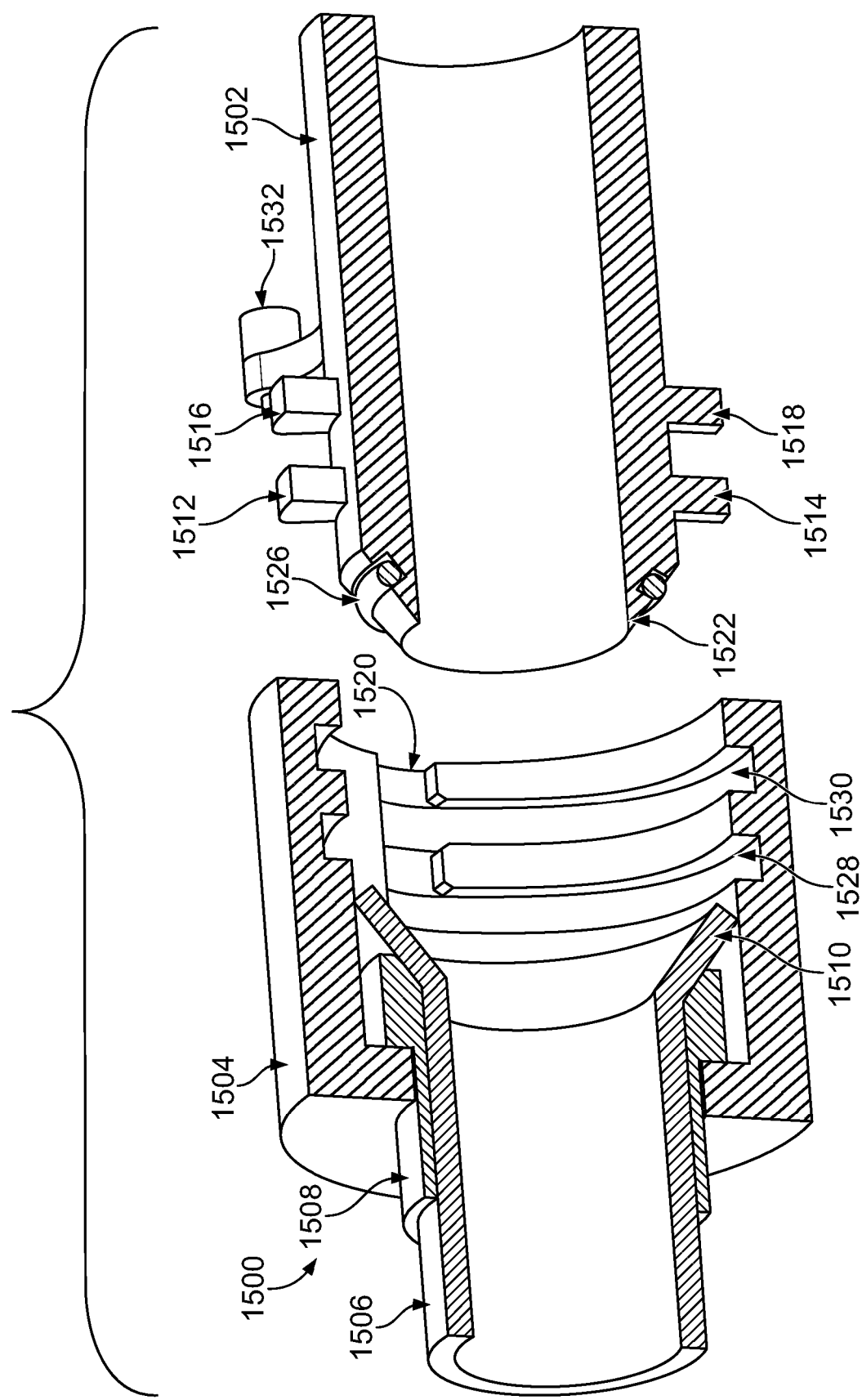
FIG. 15 illustrates an exploded cross-sectional view of a fluid connection system, in accordance with an example implementation.
Figure 16:
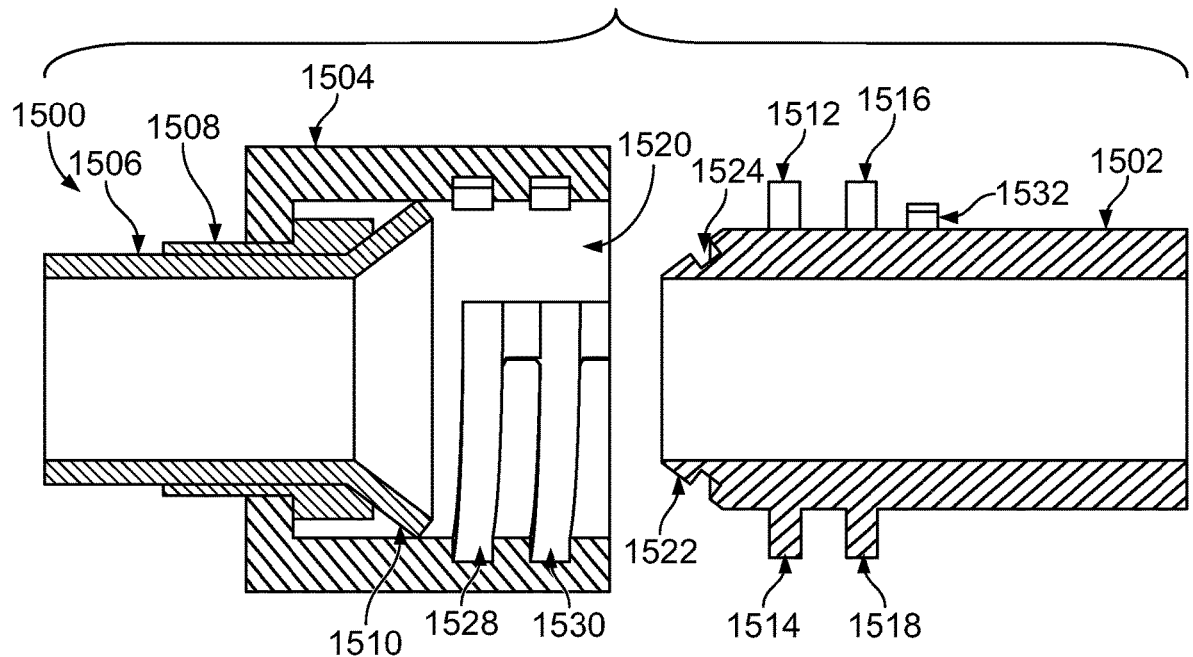
FIG. 16 illustrates a cross-sectional exploded side view of the fluid connection system of FIG. 15, in accordance with an example implementation.
Figure 17:
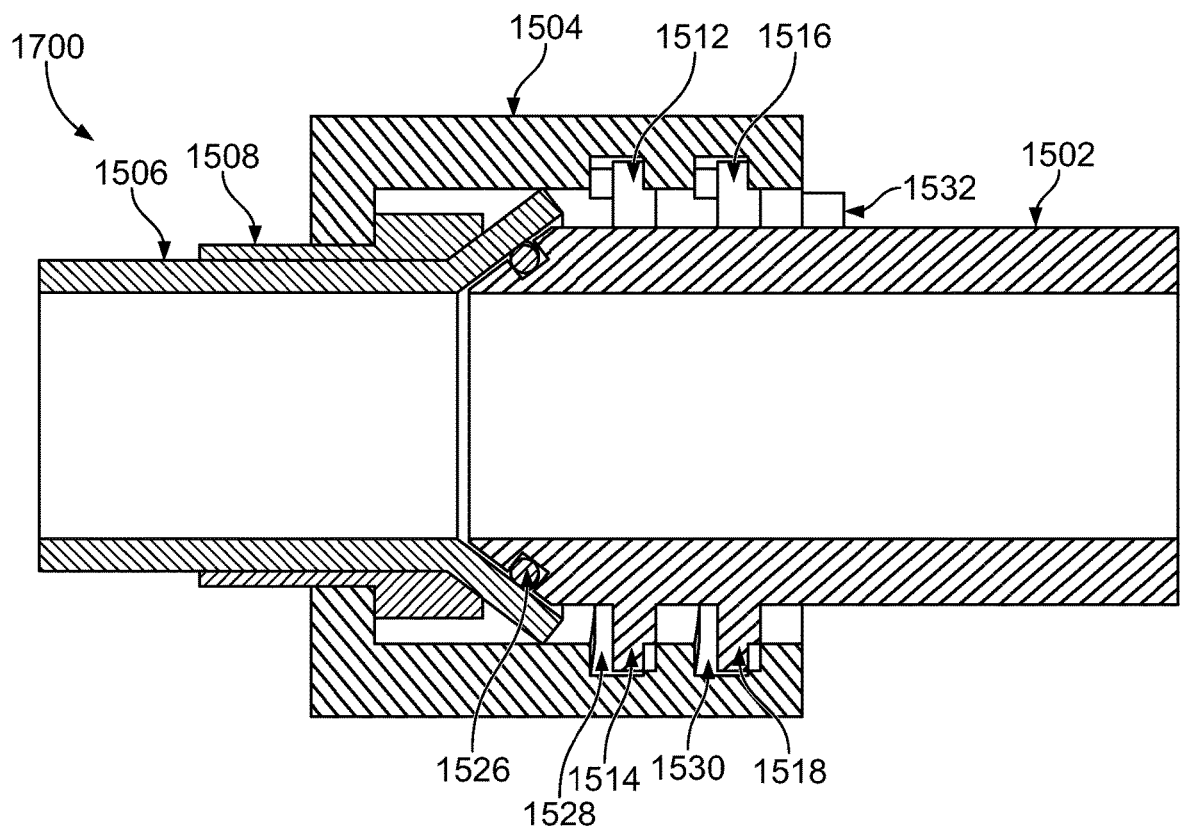
FIG. 17 illustrates an assembly of the fluid connection system of FIG. 15, in accordance with an example implementation.

FIG. 15 illustrates an exploded cross-sectional view of a fluid connection system 1500, FIG. 16 illustrates a cross-sectional exploded side view of the fluid connection system 1500, and FIG. 17 illustrates an assembly 1700 of the fluid connection system 1500, in accordance with an example implementation. FIGS. 15-17 are described together.

The fluid connection system 1500 includes a fitting 1502 and a coupling nut 1504 mounted to a fluid line 1506 (e.g., a tube or hose). The fluid connection system 1500 can also include a sleeve 1508 disposed about the exterior peripheral surface of the fluid line 1506. The sleeve 1508 can operate as an anvil when forming an angled or sloped flanged end 1510 of the fluid line 1506. Further, the sleeve 1508 provides a flat exterior surface upon which that coupling nut 1504 can be mounted to facilitate mounting the coupling nut 1504 to the fluid line 1506.

Particularly, in an example, the coupling nut 1504 can have an interior annular shoulder and the sleeve 1508 can have a stepped exterior surface that forms an exterior annular shoulder. The exterior annular shoulder of the sleeve 1508 can mate with the interior annular shoulder of the coupling nut 1504 when the coupling nut 1504 is mounted to the fluid line 1506. Once the sloped flanged end 1510 is formed at an end of the fluid line 1506, the sleeve 1508 can preclude the fluid line 1506 from being disassembled or "falling off" when pulled in an axial direction. Similarly, the sleeve 1508 and the sloped flanged end 1510 can preclude the coupling nut 1504 from being disassembled or "falling off" when pulled in axial direction. In other examples, the coupling nut 1504 can be configured to be mounted directly to the fluid line 1506 without the sleeve 1508.

The fitting 1502 can have a first set of ears 1512, 1514 protruding from the fitting 1502. The ears 1512, 1514 can, for example, be 180 degrees apart relative to an exterior surface of the fitting 1502. The fitting 1502 can further have a second set of ears 1516, 1518 protruding from the fitting 1502 and are axially-spaced from the first set of ears 1512, 1514 along a length of the fitting 1502. The ears 1516, 1518 can also be 180 degrees apart relative to the exterior surface of the fitting 1502. More or fewer sets of ears can be used.

The coupling nut 1504 can have channels such as channel 1520 that correspond to the ears of the fitting 1502. For example, the fitting 1502 or the coupling nut 1504 can be rotated to align the ears 1512, 1516 with the channel 1520 (and align the other ears 1514, 1518 with a corresponding channel) to allow the coupling nut 1504 to slide axially over the fitting 1502 and the fitting 1502 to slide into the coupling nut 1504.

The fitting 1502 can further include a conical or tapered end 1522 having an annular groove 1524 configured to receive a radial seal 1526 therein. When the fitting 1502 is inserted into the coupling nut 1504 (or the coupling nut 1504 is slid over the fitting 1502), the tapered end 1522 can mate with the sloped flanged end 1510, which provides a sealing surface for the radial seal 1526.

The coupling nut 1504 can further include a plurality of helical grooves such as helical groove 1528 and helical groove 1530 that are axially-spaced apart along an interior surface of the coupling nut 1504. The helical grooves 1528, 1530 correspond respectively to the first set of ears 1512, 1514 and the second set of ears 1516, 1518. Particularly, the helical groove 1528 is configured to receive the set of ears 1512, 1514 therein, and the helical groove 1530 is configured to receive the set of ears 1516, 1518.

The helical grooves 1528, 1530 operate as thread grooves. Particularly, when the coupling nut 1504 is slid axially relative to the fitting 1502 while the ears 1512-1518 are aligned with the corresponding channels of the coupling nut 1504, the ears can move inside the coupling nut 1504 until they reach their respective helical grooves, i.e., the ears 1512, 1514 reach the helical groove 1528 and the ears 1516, 1518 reach the helical groove 1530. The tapered end 1522 of the fitting 1502 also mates with the sloped flanged end 1510 of the fluid line 1506.

The coupling nut 1504 can then be rotated relative to the fitting 1502, and because of the helical, thread-like configuration of the helical grooves 1528, 1530, the fitting 1502 is pulled axially within the coupling nut 1504, forcing the tapered end 1522 of the fitting 1502 tighter against the sloped flanged end 1510 of the fluid line 1506, thereby squeezing or compressing the radial seal 1526 and creating an effective seal between the fitting 1502 and the coupling nut 1504. In other example implementations, the flanged end of the fluid line 1506 can be configured as a 90 degree flange as opposed to a sloped flanged end, and in these implementations the fitting can have a face seal, rather than a radial seal, that can mate with a flat surface of the 90 degree flanged end of the fluid line.

Friction between the ears 1512-1518 and the helical grooves 1528, 1530 can reduce the likelihood of the coupling nut 1504 rotating back. Additionally, the fluid connection system 1500 can include any of the anti-rotation features and elements discussed herein. For example, the fitting 1502 can include anti-rotation pin 1532 that, similar to the anti-rotation pin 122, can include a spring-loaded plunger (e.g., similar to the spring-loaded plunger 126) as described above with respect to FIGS. 1-2. The coupling nut 1504 can include a corresponding indentation (similar to the indentation 228) that can receive the spring-loaded plunger therein when the coupling nut 1504 is rotated to a particular rotational position, thereby precluding relative rotation between the fitting 1502 and the coupling nut 1504. However, any other anti-rotation configuration, elements, and features described herein can be used.

The fluid connections systems described above thus provide a configuration where no threads are used to couple a fitting to a coupling nut and a fluid line. Rather, the fitting and the coupling nut can be assembled by hand using a low torque. The use of a dynamic radial seal can further facilitate low torque/and-tightened assembly and allows for low manufacturing tolerance in machining the fitting and the coupling nut.

Further, using ears and channels along with an anti-rotation configuration allows for a push-and-twist stable connection with an effective sealing. The anti-rotation configuration precludes backing out of the coupling nut or the fitting once assembled to the coupling nut. The anti-rotation configuration also inhibits over-rotating the fitting or the coupling nut as it provides a visual indication that the assembly is completed and the assembly is able to withstand fluid pressure.

Further, the configurations of fluid connection systems disclosed herein facilitate inspection, disassembly, and maintenance. The anti-rotation element can be released, thereby allowing relative rotation of the fitting and the coupling nut and separating them for inspection and maintenance without cutting and replacing the fluid line and the fitting as is performed in conventional fluid connection systems.

FIG. 18 is a flowchart of a method 1800 for assembling a fluid connection system, in accordance with an example implementation. The method 1800 can be used with any of the fluid connection systems described above.

The method 1800 may include one or more operations, functions, or actions as illustrated by one or more of blocks 1802-1808. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1802, the method 1800 includes aligning a fitting to a coupling nut, wherein the fitting includes one or more ears protruding radially outward from the fitting, wherein the coupling nut includes one or more interior annular grooves and one or more channels, wherein aligning the fitting to the coupling nut includes aligning the one or more ears with the one or more channels.

At block 1804, the method 1800 includes axially moving the coupling nut relative to the fitting such that the one or more ears of the fitting traverse the one or more channels and reach the one or more interior annular grooves of the coupling nut.

At block 1806, the method 1800 includes rotating the coupling nut relative to the fitting, thereby causing the one or more ears to rotationally traverse the one or more interior annular grooves, wherein the fitting includes a first anti-rotation feature and the coupling nut includes a second anti-rotation feature, wherein the first anti-rotation feature is misaligned with the second anti-rotation feature when the one or more ears are aligned with the one or more channels, and wherein rotating the coupling nut relative to the fitting includes rotating the coupling nut until the first anti-rotation feature is aligned with the second anti-rotation feature.

At block 1808, the method 1800 includes engaging an anti-rotation element with the first anti-rotation feature and the second anti-rotation feature, thereby rotationally coupling the fitting to the coupling nut and precluding relative rotation therebetween.

As described above the anti-rotation features can be holes, grooves, cavities, slots, slits, etc., whereas the anti-rotation element can include a pin, a spring-loaded plunger, flexible elements (balls, bars, inserts, etc.), a cotter pin, a clasp, one or more magnets, etc.

The detailed description above describes various features and operations of the disclosed systems, assemblies, components, and methods with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A fluid connection system comprising:
a fitting comprising one or more ears protruding radially outward;
a coupling nut comprising an interior annular groove and one or more channels, wherein the one or more channels are configured to allow the one or more ears of the fitting to pass therethrough and reach the interior annular groove as the coupling nut is slid axially relative to the fitting to mount the coupling nut to the fitting, and wherein the one or more ears are configured to rotationally traverse the interior annular groove when rotating the coupling nut relative to the fitting; and
an anti-rotation element configured to rotationally couple the fitting to the coupling nut when the coupling nut reaches a predetermined rotational position relative to the fitting, such that the anti-rotation element precludes relative rotation between the fitting and the coupling nut, wherein the anti-rotation element comprises a flexible ball protruding radially inward from an interior surface of the coupling nut and configured to be compressed when the coupling nut is slid over the fitting, wherein the fitting further comprises an indentation, wherein the indentation is misaligned with the flexible ball when the one or more ears are axially traversing the one or more channels, and wherein rotating the coupling nut relative to the fitting to the predetermined rotational position causes the flexible ball to be released into the indentation, thereby rotationally coupling the fitting to the coupling nut.

2. The fluid connection system of claim 1, wherein the coupling nut further comprises an additional anti-rotation feature, wherein the additional anti-rotation feature is misaligned with the anti-rotation element when the one or more ears are axially traversing the one or more channels, and wherein rotating the coupling nut relative to the fitting to the predetermined rotational position causes the additional anti-rotation feature to be aligned with the anti-rotation element, thereby enabling the anti-rotation element to couple the fitting to the coupling nut and preclude relative rotation therebetween.

3. The fluid connection system of claim 1, wherein the anti-rotation element further comprises a spring-loaded plunger disposed in the fitting, wherein the coupling nut further comprises a respective indentation, wherein the respective indentation is misaligned with the spring-loaded plunger when the one or more ears are axially traversing the one or more channels, and wherein rotating the coupling nut relative to the fitting to the predetermined rotational position causes the spring-loaded plunger to be aligned with and released into the respective indentation, thereby rotationally coupling the fitting to the coupling nut.

4. The fluid connection system of claim 1, wherein the anti-rotation element further comprises a spring configured to be compressed between an end of the fitting and an interior surface of the coupling nut when the coupling nut is slid over the fitting, and wherein upon rotating the coupling nut relative to the fitting in a first rotational direction, the spring applies a biasing force on the fitting, causing the one or more ears to be pressed against a side wall bounding the interior annular groove of the coupling nut to preclude the one or more ears from rotating back in a second rotational direction opposite the first rotational direction.

5. The fluid connection system of claim 1, wherein:
the anti-rotation element further comprises a flexible insert disposed in the fitting and protruding radially outward from an exterior surface of the fitting,
the flexible insert is configured to be compressed when the coupling nut is slid over the fitting,
the interior annular groove of the coupling nut is a first interior annular groove, wherein the coupling nut further comprises a second interior annular groove that is axially-spaced from the first interior annular groove, wherein the second interior annular groove comprises a recess that forms a protrusion within the second interior annular groove,
when the one or more ears reach the first interior annular groove, the flexible insert is released into the second interior annular groove, and
wherein rotating the coupling nut relative to the fitting to the predetermined rotational position causes the flexible insert to pass the recess and be precluded from rotating in an opposite direction by the protrusion of the recess.

6. The fluid connection system of claim 1, wherein the anti-rotation element further comprises a cotter pin, wherein the fitting comprises a first through-hole and the coupling nut comprises a second through-hole, wherein the second through-hole is misaligned with the first through-hole when the one or more ears are axially traversing the one or more channels, and wherein rotating the coupling nut relative to the fitting to the predetermined rotational position causes the second through-hole to be aligned with the first through-hole, thereby enabling the cotter pin to be inserted through the first through-hole and the second through-hole and rotationally couple the fitting to the coupling nut.

7. The fluid connection system of claim 1, wherein the anti-rotation element further comprises a clasp, wherein the fitting comprises a first slot and the coupling nut comprises a second slot, wherein the second slot is misaligned with the first slot when the one or more ears are axially traversing the one or more channels, and wherein rotating the coupling nut relative to the fitting to the predetermined rotational position causes the second slot to be aligned with the first slot, thereby enabling the clasp to be placed in the first slot and the second slot to rotationally couple the fitting to the coupling nut.

8. The fluid connection system of claim 1, wherein the anti-rotation element further comprises a first magnet positioned in a first magnet slot in the coupling nut and a second magnet positioned in a second magnet slot in the fitting, wherein the second magnet is misaligned with the first magnet when the one or more ears are axially traversing the one or more channels, and wherein rotating the coupling nut relative to the fitting to the predetermined rotational position causes the second magnet to be aligned with the first magnet, thereby generating a magnetic retention force therebetween to rotationally couple the fitting to the coupling nut.

9. The fluid connection system of claim 8, wherein the first magnet slot is formed in an ear of the one or more ears of the fitting.

10. A method comprising:
aligning a fitting to a coupling nut, wherein the fitting includes one or more ears protruding radially outward from the fitting, wherein the coupling nut includes one or more interior annular grooves and one or more channels, wherein aligning the fitting to the coupling nut includes aligning the one or more ears with the one or more channels;
axially moving the coupling nut relative to the fitting such that the one or more ears of the fitting traverse the one or more channels and reach the one or more interior annular grooves of the coupling nut;
rotating the coupling nut relative to the fitting, thereby causing the one or more ears to rotationally traverse the one or more interior annular grooves, wherein the fitting includes a first anti-rotation feature comprising a first magnet slot formed in an ear of the one or more ears of the fitting, wherein the coupling nut includes a second anti-rotation feature comprising a second magnet slot, wherein the first anti-rotation feature is misaligned with the second anti-rotation feature when the one or more ears are aligned with the one or more channels, and wherein rotating the coupling nut relative to the fitting comprises rotating the coupling nut until the first anti-rotation feature is aligned with the second anti-rotation feature; and
engaging an anti-rotation element with the first anti-rotation feature and the second anti-rotation feature, thereby rotationally coupling the fitting to the coupling nut and precluding relative rotation therebetween, wherein the anti-rotation element comprises a first magnet positioned in the first magnet slot and a second magnet positioned in the second magnet slot, and wherein engaging the anti-rotation element comprises generating a magnetic retention force between the first magnet and the second magnet to rotationally couple the fitting to the coupling nut.

11. The method of claim 10, wherein the first anti-rotation feature further comprises a threaded hole in the fitting, wherein the second anti-rotation feature further comprises an indentation in the coupling nut, wherein the anti-rotation element further comprises a spring-loaded plunger disposed in the threaded hole, wherein engaging the anti-rotation element comprises:
releasing the spring-loaded plunger into the indentation of the coupling nut, thereby rotationally coupling the fitting to the coupling nut.

12. The method of claim 10, wherein the first anti-rotation feature further comprises a first indentation in the fitting, wherein the second anti-rotation feature further comprises a second indentation in the coupling nut, wherein the anti-rotation element further comprises a flexible ball disposed in the first indentation or the second indentation, and wherein engaging the anti-rotation element comprises:

releasing the flexible ball into the other indentation when the first indentation is aligned with the second indentation, thereby rotationally coupling the fitting to the coupling nut.

13. The method of claim 10, wherein the first anti-rotation feature further comprises a slit in the fitting, wherein the second anti-rotation feature further comprises an interior annular groove having a recess that forms a protrusion within the interior annular groove, wherein the anti-rotation element further comprises a flexible insert disposed in the slit of the fitting and protruding radially outward therefrom, wherein the flexible insert is configured to be compressed when the coupling nut is axially moved over the fitting, and wherein engaging the anti-rotation element comprises:

rotating the coupling nut relative to the fitting in a first rotational direction, causing the flexible insert rotationally traverse the interior annular groove until the flexible insert passes the recess; and engaging the flexible insert with the protrusion to preclude coupling nut from rotating in a second rotational direction opposite the first rotational direction.

14. The method of claim 10, wherein the first anti-rotation feature further comprises a first through-hole in the fitting, wherein the second anti-rotation feature further comprises a second through-hole in the coupling nut, wherein the anti-rotation element further comprises a cotter pin, and wherein engaging the anti-rotation element comprises:

inserting the cotter pin through the first through-hole and the second through-hole to rotationally couple the fitting to the coupling nut.

15. The method of claim 10, wherein the first anti-rotation feature further comprises a first slot in the fitting, wherein the second anti-rotation feature further comprises a second slot in the coupling nut, wherein the anti-rotation element further comprises a clasp, and wherein engaging the anti-rotation element comprises:

placing the clasp in the first slot and the second slot to rotationally couple the fitting to the coupling nut.

16. A fluid connection system comprising:

a fitting comprising a first set of ears protruding radially outward and a second set ears protruding radially outward, wherein the second set of ears is axially-spaced from the first set of ears along a length of the fitting, and wherein the fitting further comprises a tapered end having an annular groove formed therein;

a coupling nut comprising a first helical groove, a second helical groove, and one or more channels, wherein the one or more channels are configured to allow the first set of ears and the second set of ears of the fitting to pass therethrough and reach the first helical groove and the second helical groove, respectively, as the coupling nut is slid axially relative to the fitting to mount the coupling nut to the fitting, and wherein the first set of ears is configured to rotationally traverse the first helical groove and the second set of ears is configured to rotationally traverse the second helical groove when rotating the coupling nut relative to the fitting, thereby pulling the coupling nut and the fitting toward each other;

an anti-rotation element configured to rotationally couple the fitting to the coupling nut when the coupling nut reaches a predetermined rotational position relative to the fitting, such that the anti-rotation element precludes relative rotation between the fitting and the coupling nut;

a radial seal disposed in the annular groove of the fitting;

a fluid line to which the coupling nut is mounted, wherein the fluid line comprises a sloped flanged end, wherein pulling the coupling nut and the fitting toward each other upon rotating the first set of ears and the second set of ears in the first helical groove and the second helical groove, respectively, causes the tapered end of the fitting to squeeze the radial seal against the sloped flanged end of the fluid line; and a sleeve disposed about the exterior peripheral surface of the fluid line, wherein the sleeve is configured as an anvil when forming the sloped flanged end of the fluid line, and wherein the sleeve provides a flat exterior surface upon which the coupling nut is mounted to facilitate mounting the coupling nut to the fluid line.

17. The fluid connection system of claim 16, wherein the coupling nut has an interior annular shoulder and the sleeve has a stepped exterior surface that forms an exterior annular shoulder, wherein the exterior annular shoulder of the sleeve mates with the interior annular shoulder of the coupling nut when the coupling nut is mounted to the fluid line.

\* \* \* \* \*